US010665411B2

(12) United States Patent
Watford

(10) Patent No.: US 10,665,411 B2
(45) **Date of Patent: *May 26, 2020**

(54) IN MULTI-POLE ELECTRONIC CIRCUIT BREAKERS PREVENTING BREAKER ARMATURE FROM LATCHING WITH CRADLE IF CERTAIN CRITERIA ARE MET

(71) Applicant: Siemens Industry, Inc., Alpharetta, GA (US)

(72) Inventor: Russell Thomas Watford, Lawrenceville, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 474 days.

This patent is subject to a terminal disclaimer.

(21) Appl. No.: 15/718,413

(22) Filed: Sep. 28, 2017

(65) Prior Publication Data

US 2019/0096619 A1 Mar. 28, 2019

(51) Int. Cl.

| | |
|---|---|
| ***H02H 3/00*** | (2006.01) |
| ***H01H 71/24*** | (2006.01) |
| ***H01H 9/54*** | (2006.01) |
| ***H01H 71/52*** | (2006.01) |
| ***H01H 71/62*** | (2006.01) |
| *H01H 83/22* | (2006.01) |
| *H01H 71/50* | (2006.01) |
| *H01H 83/20* | (2006.01) |

(52) U.S. Cl.

CPC .......... *H01H 71/2463* (2013.01); *H01H 9/54* (2013.01); *H01H 71/52* (2013.01); *H01H 71/522* (2013.01); *H01H 71/62* (2013.01); *H01H 71/505* (2013.01); *H01H 71/523* (2013.01); *H01H 83/22* (2013.01); *H01H 2083/201* (2013.01)

(58) Field of Classification Search

None

See application file for complete search history.

(56) References Cited

U.S. PATENT DOCUMENTS 4,550,300 A * 10/1985 Jencks ................. H01H 71/505 335/16
5,220,303 A * 6/1993 Pannenborg ......... H01H 71/505 335/167
6,052,047 A * 4/2000 Malingowski ..... H01H 71/0228 335/202
9,685,293 B1 * 6/2017 Watford ............. H01H 71/1054

* cited by examiner

*Primary Examiner* — Stephen W Jackson

(57) ABSTRACT

A multi-pole circuit breaker such as a residential electronic circuit breaker is provided. It includes a means to prevent a breaker mechanism from latching, i.e., a breaker armature from latching with a cradle if certain criterion is met. In particular, the multi-pole circuit breaker comprises a breaker mechanism including a breaker armature, a cradle and an armature latch bar to prevent the breaker armature from latching with the cradle. The armature latch bar includes a recessed feature that interfaces with the breaker armature, an armature latching surface that needs to be removed before the breaker mechanism can be latched and an armature latching lever that prevents a rotation of the breaker armature.

20 Claims, 17 Drawing Sheets

Detail G

Detail F

Detail H

Detail E

Detail G

Detail F

Detail H

Detail E

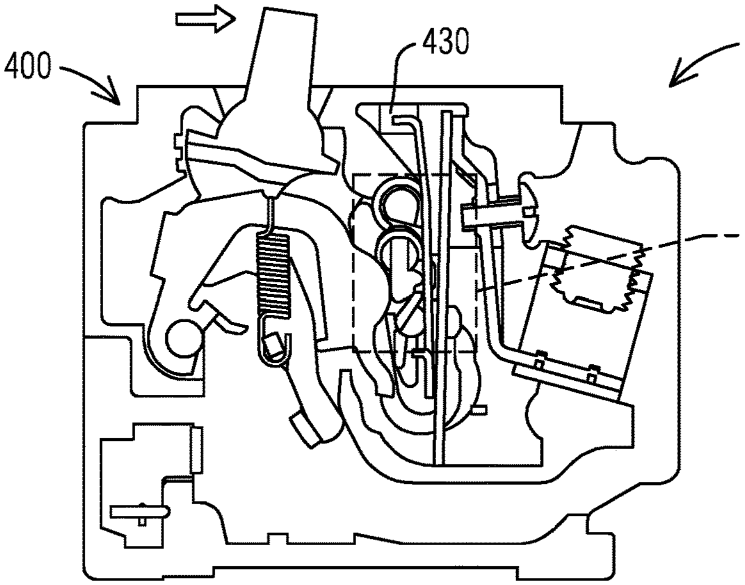
FIG. 20
FIG. 21
Detail G
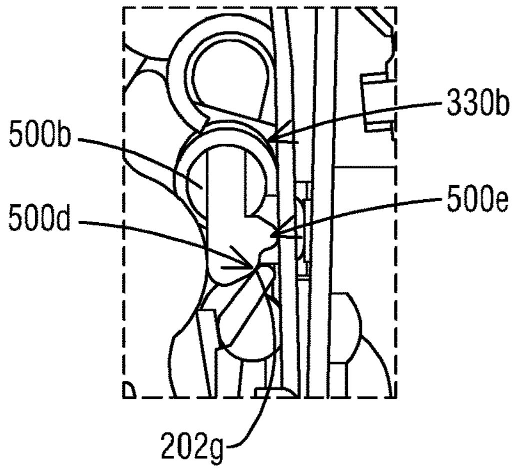
FIG. 22
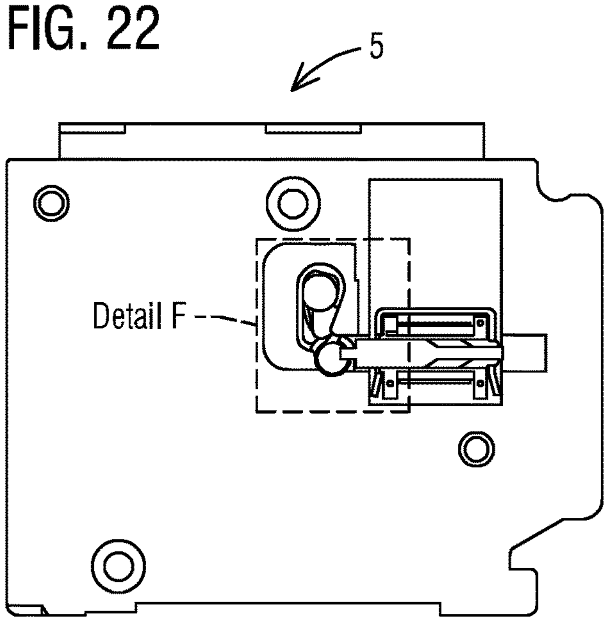
FIG. 23
Detail F
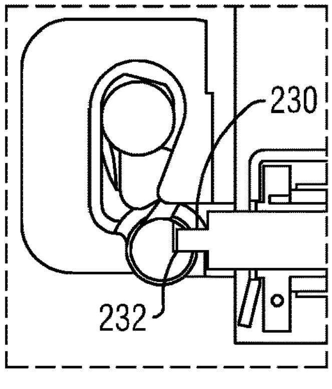

Detail H

Detail E

Section A-A

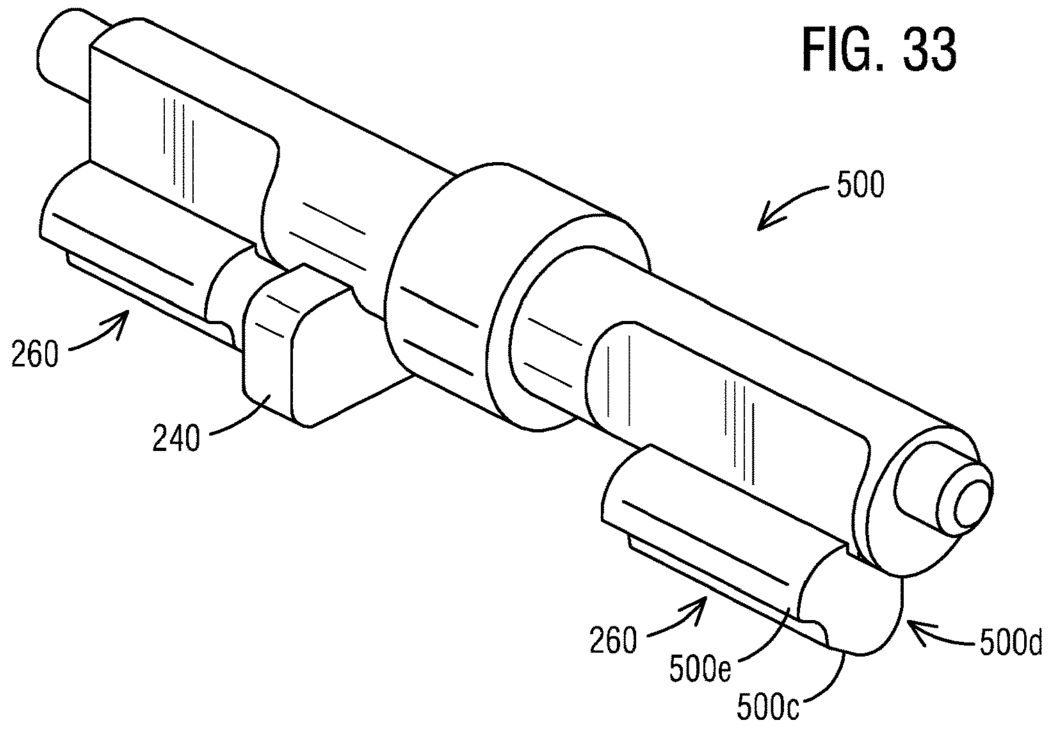
FIG. 33
FIG. 34
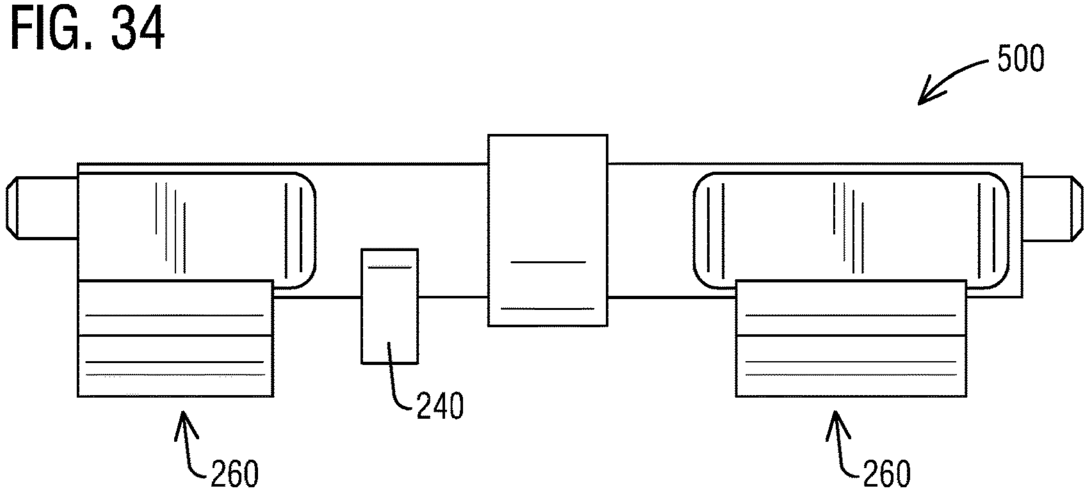
FIG. 35
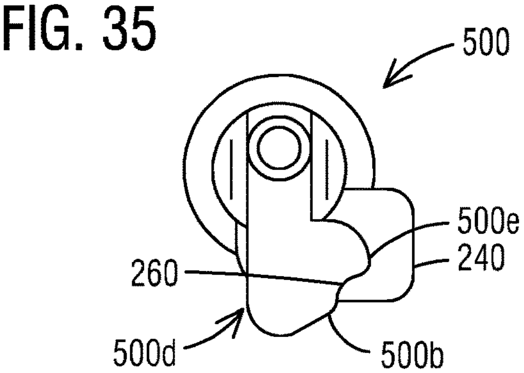

Section X-X

Detail A

Section B-B

Detail A

Section B-B

Section A-A

Detail A

IN MULTI-POLE ELECTRONIC CIRCUIT BREAKERS PREVENTING BREAKER ARMATURE FROM LATCHING WITH CRADLE IF CERTAIN CRITERIA ARE MET

BACKGROUND

1. Field

Aspects of the present invention generally relate to in multi-pole circuit breakers preventing a breaker armature from latching with a cradle and more specifically relate to two or three pole residential electronic circuit breakers with a means to prevent a breaker mechanism from latching if certain criterion is met.

2. Description of the Related Art

A circuit breaker is an automatically operated electrical switch designed to protect an electrical circuit from damage caused by excess current, typically resulting from an overload or short circuit. Its basic function is to interrupt current flow after a fault is detected. Unlike a fuse, which operates once and then must be replaced, a circuit breaker can be reset (either manually or automatically) to resume normal operation. Circuit breakers are made in varying sizes, from small devices that protect low-current circuits or individual household appliance, up to large switchgear designed to protect high voltage circuits feeding an entire city. The generic function of a circuit breaker is to provide an automatic means of removing power from a faulty system.

A wide array of thermal-magnetic circuit breakers is the key element for overload and short-circuits protection of a home's electrical system. To provide additional protection circuit breakers can also protect against severe electrical shock or electrocution, mitigate the risk of electrical fires and protect against damaging surges and voltage spikes.

Circuit breakers may be of various types such as residential circuit breakers, molded case circuit breakers, power circuit preachers or control circuit protection. Residential circuit breakers are intended for switching and protection of your home's wiring from high temperatures caused by excess current higher than the rating of the wire. While thermal-magnetic circuit breakers are the key element for overload and short-circuit protection of your electrical system, there are potentially dangerous conditions that do not involve over current. Special circuit breakers may be utilized to provide further protection.

Two or three pole residential circuit breakers do not provide a means to prevent a breaker mechanism from latching. Thus preventing the main contacts to close under certain conditions. One condition is if the Arc or Ground Fault circuitry is no longer able to detect a fault condition. The second condition is if a fault condition is present before the main contacts are closed. A third condition is if the self test determines the circuitry is not functioning properly. In all cases, breaker handles today can be rotated to the ON position and the main contacts close in a two and/or three pole device. Prior art solutions do not address these scenarios.

Therefore, there is a need for circuit breakers to prevent the breaker mechanism from latching while overcoming various problems and shortcomings of the prior art.

SUMMARY

Briefly described, aspects of the present invention relate to two or three pole residential electronic circuit breakers that include a means to prevent its breaker mechanism from latching if certain criteria are met. Thus prevent the main contacts from closing under certain conditions. One condition is if the Arc or Ground Fault circuitry is no longer able to detect a fault condition. The second condition is if a fault condition is present before the main contacts are closed. A third condition is if the self test determines the circuitry is not functioning properly. In all these conditions, a breaker handle can be rotated to an ON position but the main contacts cannot close in a two and/or three pole circuit breaker device.

In accordance with one illustrative embodiment of the present invention, a multi-pole circuit breaker is provided. It comprises a breaker mechanism including a breaker armature, a cradle and an armature latch bar to prevent the breaker armature from latching with the cradle. The armature latch bar includes a recessed feature that interfaces with the breaker armature, an armature latching surface that needs to be removed before the breaker mechanism can be latched, and an armature latching lever that prevents a rotation of the breaker armature.

In accordance with another illustrative embodiment of the present invention, a ground fault circuit interrupter (GFCI) and/or a combination arc-fault circuit interrupting (CAFCI) two or three pole residential circuit breaker is provided. It comprises a breaker mechanism including a breaker armature, a cradle, and an armature latch bar to prevent the breaker armature from latching with the cradle. The armature latch bar includes a recessed feature that interfaces with the breaker armature, an armature latching surface that needs to be removed before the breaker mechanism can be latched, and an armature latching lever that prevents a rotation of the breaker armature. It further comprises a breaker trip bar that includes a recessed area to interface with the armature latch bar and a printed circuit board (PCB) assembly including an electronic circuitry to activate at least one of a solenoid assembly and an electromagnet.

Still other aspects, features, and advantages of the present invention may be readily apparent from the following description by illustrating a number of example embodiments and implementations. The present invention may also be capable of other and different embodiments, and its details may be modified in various respects, all without departing from the substance and scope of the present invention. The invention covers all modifications, equivalents, and alternatives falling within the substance and scope of the invention.

BRIEF DESCRIPTION OF THE DRAWINGS

FIG. 20 illustrates a schematic view of the breaker mechanism shown between a trip position and a reset position with maximum rotation of a breaker trip bar and maximum rotation of an armature latch bar in accordance with an exemplary embodiment of the present invention.

FIG. 21 illustrates a zoomed-in view of the breaker mechanism shown of FIG. 20 in accordance with an exemplary embodiment of the present invention.

FIG. 22 illustrates a schematic view of a solenoid and an armature latch bar shown latched in accordance with an exemplary embodiment of the present invention.

FIG. 23 illustrates a zoomed-in view of the solenoid and the armature latch bar of FIG. 22 according to an exemplary embodiment of the present invention.

FIG. 33 illustrates a perspective view of a breaker trip bar for a 2 and/or 3 pole circuit breaker according to an exemplary embodiment of the present invention.

FIG. 34 illustrates a front view of the breaker trip bar of FIG. 33 according to an exemplary embodiment of the present invention.

FIG. 35 illustrates a side view of the breaker trip bar of FIG. 33 according to an exemplary embodiment of the present invention.

DETAILED DESCRIPTION

Figure 1:
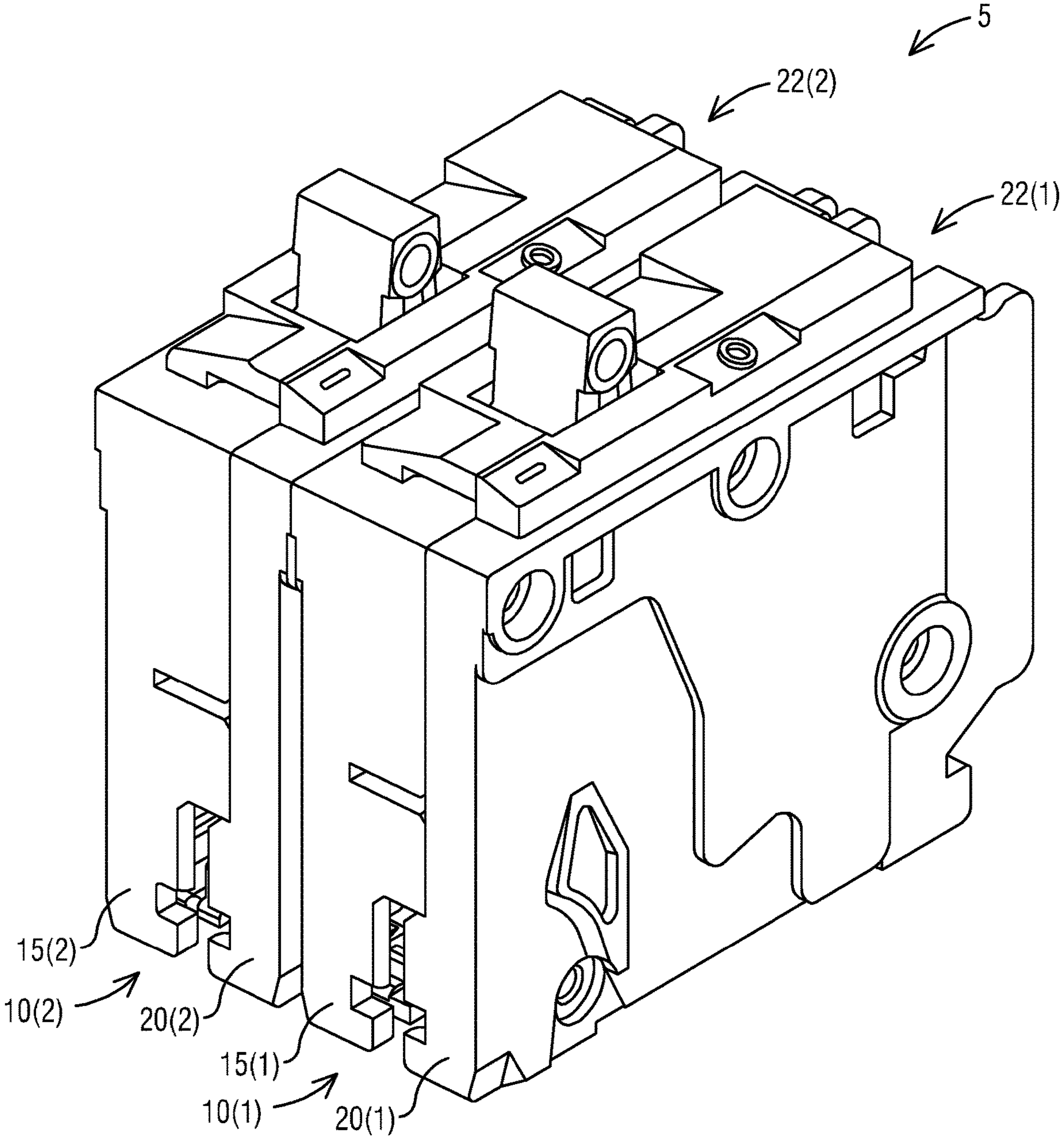
FIG. 1 illustrates a perspective view of a two-pole residential electronic circuit breaker in accordance with an exemplary embodiment of the present invention.

To facilitate an understanding of embodiments, principles, and features of the present invention, they are explained hereinafter with reference to implementation in illustrative embodiments. In particular, they are described in the context of a multi-pole circuit breaker comprising a breaker mechanism including a breaker armature, a cradle and an armature latch bar to prevent the breaker armature from latching with the cradle. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of a 2-pole/3-pole residential electronics circuit breaker are described below with reference to FIGS. 1-52. The drawings are not necessarily drawn to scale. Like reference numerals are used throughout to denote like elements.

Consistent with one embodiment of the present invention, FIG. 1 represents a perspective view of a 2-pole residential electronic circuit breaker 5 in accordance with an exemplary embodiment of the present invention. The 2-pole residential electronic circuit breaker 5 being a multi-pole circuit breaker it can be adapted in a 3-pole circuit breaker. FIG. 1 shows a complete assembly of the 2-pole residential electronic circuit breaker 5. The 2-pole residential electronic circuit breaker 5 includes a means to lock breaker armatures from latching with breaker cradles.

The 2-pole residential electronic circuit breaker 5 comprises of multiple modules. In one embodiment, the 2-pole residential electronic circuit breaker 5 includes a left module 10(1) and a right module 10(2). Each module 10 consists of a base (15(1) and 15(2)) and a cover (20(1) and 20(2)). The bases 15 and covers 20 can be made of a thermoset resin material such as BMC 620.

The 2-pole residential electronic circuit breaker 5 further comprises a left pole (LP) assembly 22(1) including the left pole (LP) base 15(1) and the left pole (LP) cover 20(1). The LP base 15(1) includes recessed areas to accommodate a printed circuit board (PCB) assembly and a wire routing. The 2-pole residential electronic circuit breaker 5 further comprises a right pole (RP) assembly 22(2) including the right pole (RP) base 15(2) and the right pole (RP) cover 20(2). The RP cover 20(2) includes recessed areas to accommodate one or more printed circuit board (PCB) components.

The left module 10(1) and the right module 10(2) include a mechanism that closes a main pair of contacts when breaker handles are rotated to ON positions simultaneously with the use of a handle tie bar (not shown). Each module 10 includes a moveable contact and a stationary contact, a moveable arm with a contact, a stationary terminal with a contact, a cradle, a breaker handle, a copper braid (not shown), a bimetal, springs, an armature, a base and a cover. These are typical mechanical components of a residential circuit breaker and can be seen in FIG. 4. The left module 10(1) and the right module 10(2) include a means to lock the breaker armature in place after a trip event.

Figure 2:
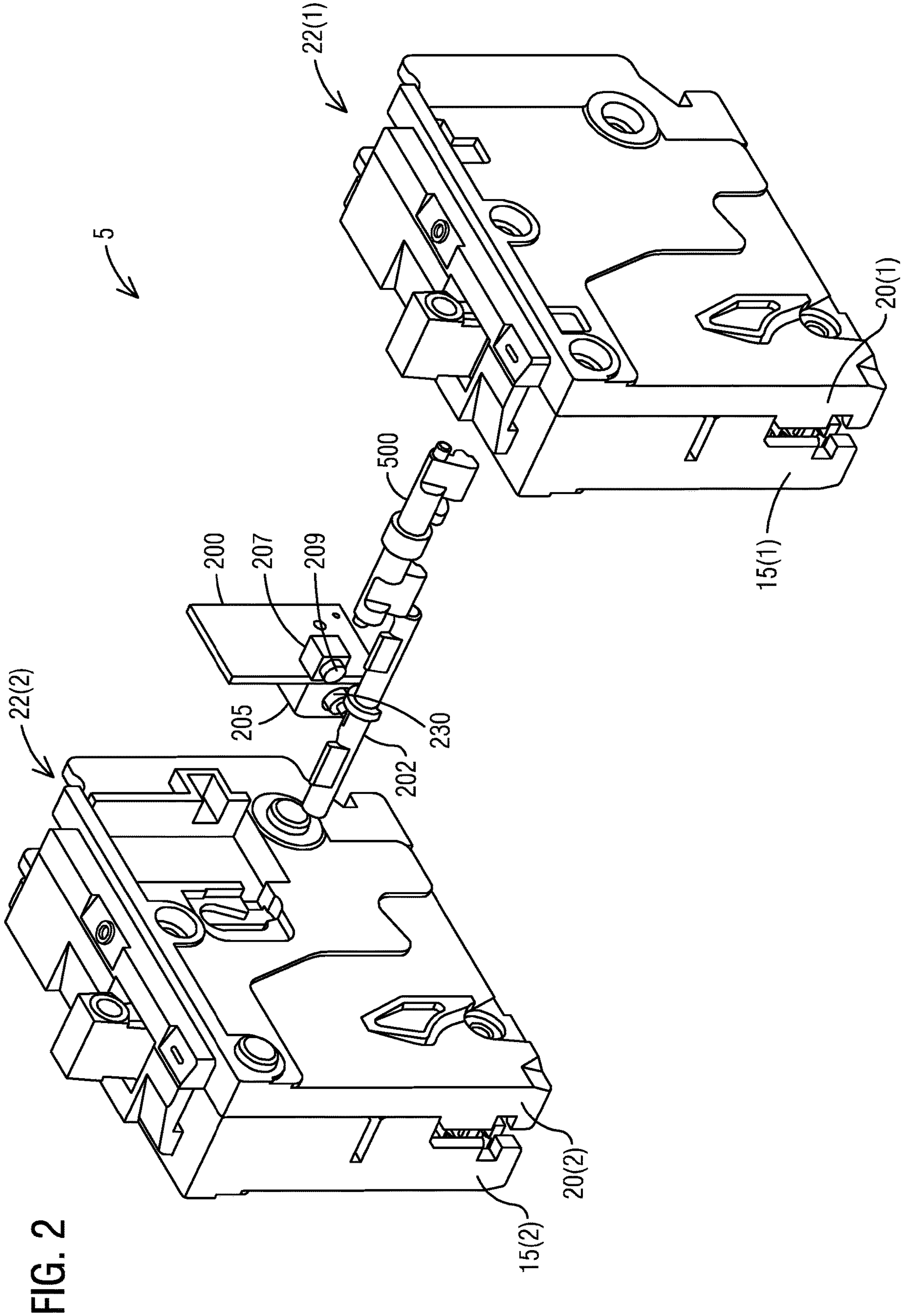
FIG. 2 illustrates a partially exploded view of the two-pole residential electronic circuit breaker of FIG. 1 in accordance with an exemplary embodiment of the present invention.

Referring to FIG. 2, it illustrates a partially exploded view of the 2-pole residential electronic circuit breaker 5 of FIG. 1 in accordance with an exemplary embodiment of the present invention. The 2-pole residential electronic circuit breaker 5 includes a printed circuit board (PCB) assembly 200, an armature latch bar 202 and a breaker trip bar 500. The PCB assembly 200 includes a solenoid 205 and a PCB switch 207. The PCB switch 207 includes a PCB switch plunger 209.

The PCB assembly 200 is captured between a base feature 210 (see FIG. 40) of the left module 10(1) and a cover feature 212 (see FIG. 43) of the right module 10(2). Power to the PCB assembly 200 is connected through a wire (not shown) from the stationary line terminals and through the base 15(1) feature 215 of the left module 10(1) (see FIG. 39). The wires are routed through a channel feature 217 of the base 15(1) of the left module 10(1) (see FIG. 39). The opposite ends of the wires are connected to PCB connections 220 (see FIG. 47). Solenoid pins 222 (see FIG. 49) are inserted and soldered to PCB holes 225 (see FIG. 47). A solenoid plunger feature 230 (see FIGS. 3, 48) is included to interface with an armature latch bar feature 232 (see FIG. 32). The right pole cover 20(2) includes a recess feature 235 (see FIG. 43) to provide clearance for a solenoid plunger. A compartment 211 in the left pole base 15(1) (see FIG. 40) provides space for the PCB switch 207 to interface with a breaker trip bar feature 240 (see FIG. 34). In certain conditions, these components prevent a breaker cradle 242 (see FIG. 4) and armature latch surfaces from latching. Therefore, main contacts are unable to close.

The armature latch bar 202 can be made of a mineral filled Phenolic material, for example Durez 152. Each end of the armature latch bar 202*a* and 202*b* (see FIG. 29) is captured in an outer module base feature 245 and a cover feature 250 (see FIG. 46 and FIG. 3 respectively). An armature latch bar feature or an armature latching lever 255 (see FIG. 30) interfaces with a breaker mechanism trip bar feature 260 (see FIG. 35).

Figure 3:
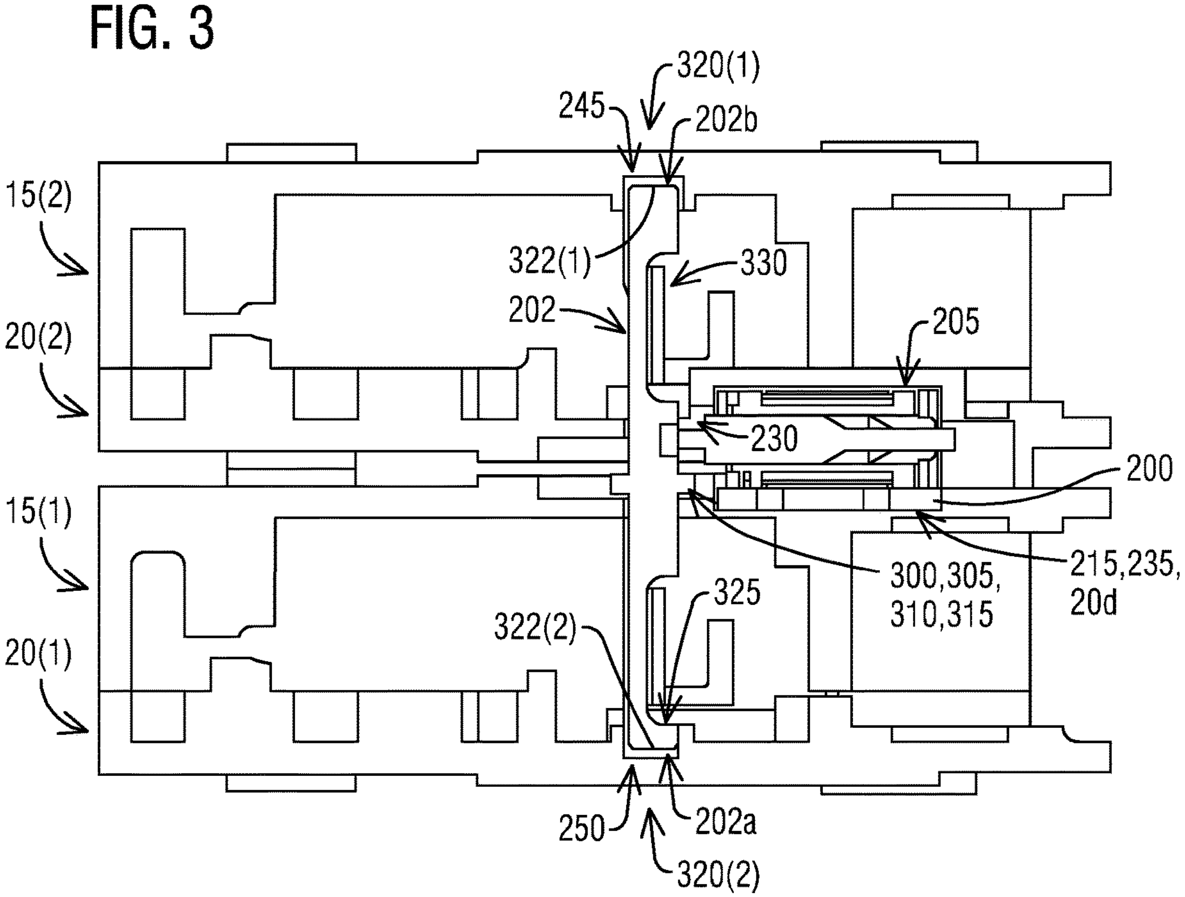
FIG. 3 illustrates a view of the two-pole residential electronic circuit breaker of FIG. 1 with an armature latch bar in accordance with an exemplary embodiment of the present invention.

Turning now to FIG. 3, it illustrates a view of the two-pole residential electronic circuit breaker 5 of FIG. 1 with the armature latch bar 202 in accordance with an exemplary embodiment of the present invention. The solenoid plunger feature 230 (see FIG. 48) interfaces with the armature latch bar feature 232 (see FIG. 32). Also included in the armature latch bar 202 are rotational stop features (300 and 305, see FIG. 31) that interface with base stop features (310 and 315) (see FIG. 41). A journal 320(1) is included in the right pole module 10(2) base 15(2) and a journal 320(2) in the left pole module 10(1) cover 20(1) to capture each end of the armature latch bar 202*a* and 202*b*. The armature latch bar 202 includes a recessed surface 325 to provide a clearance for a breaker armature 330 within each module 10. The set of journals 320(1), 320(2) are for a set of armature latch bar posts 322(1-2) to rotate about a specific point.

Figure 4:
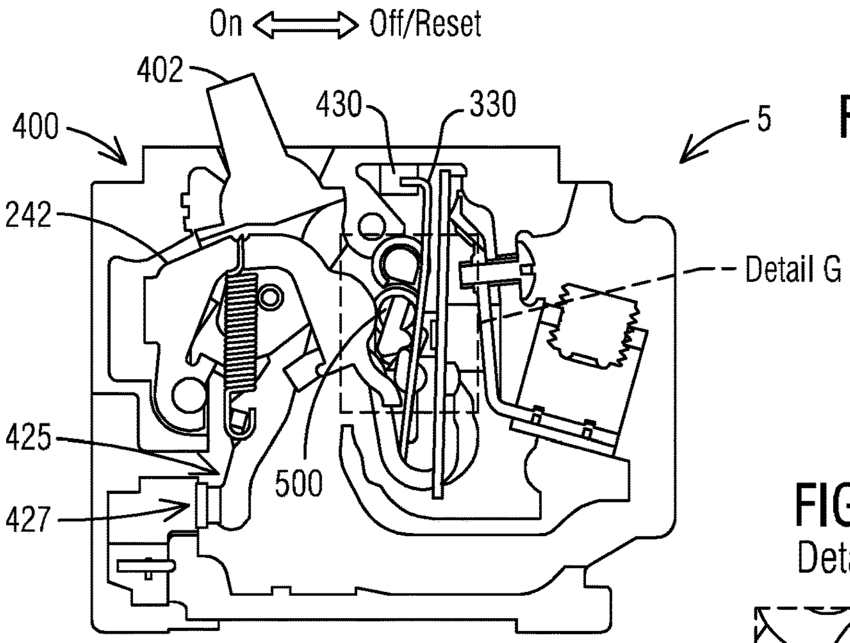
FIG. 4 illustrates a schematic view of a breaker mechanism of the two-pole residential electronic circuit breaker of FIG. 1 in an ON position in accordance with an exemplary embodiment of the present invention.
Figure 5:
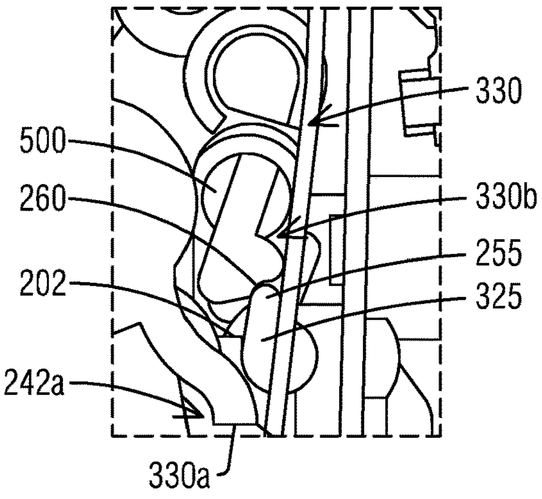
FIG. 5 illustrates a zoomed-in view of the breaker mechanism of FIG. 4 in accordance with an exemplary embodiment of the present invention.

Four views are shown in FIG. 4, FIG. 6, FIG. 8, and FIG. 10, respectively. These four views are repeated for FIGS. 12-19 and FIGS. 20-27 as the breaker mechanism 400 is shown in different positions. Specifically, FIG. 4 illustrates a schematic view of a breaker mechanism 400 of the two-pole residential electronic circuit breaker 5 of FIG. 1 with a beaker handle 402 in accordance with an exemplary embodiment of the present invention. As seen in FIG. 5, it illustrates a zoomed-in view of the breaker mechanism 400 of FIG. 4 in accordance with an exemplary embodiment of the present invention. The armature latch bar 202 includes the armature latching lever 255 that prevents a rotation of the breaker armature 330. The breaker mechanism 400 includes a breaker armature spring 430 to rotate the breaker armature 330 clockwise. The breaker mechanism 400 includes a moveable contact arm with contact 425 and a stationary line terminal with contact 427.

Figure 6:
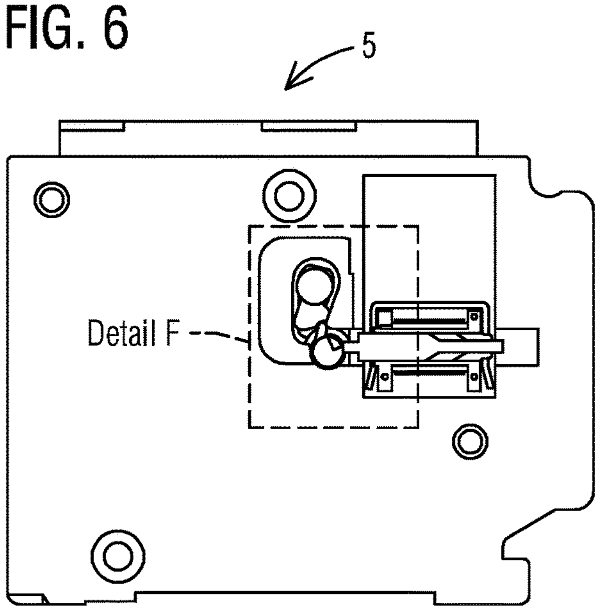
FIG. 6 illustrates a schematic view of a solenoid and an armature latch bar shown unlatched in accordance with an exemplary embodiment of the present invention.
Figure 7:
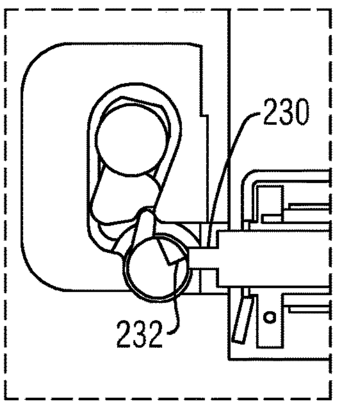
FIG. 7 illustrates a zoomed-in view of the solenoid and the armature latch bar of FIG. 6 according to an exemplary embodiment of the present invention.

As shown in FIG. 6, it illustrates a schematic view of the solenoid 205 and the armature latch bar 202 shown unlatched in accordance with an exemplary embodiment of the present invention. In FIG. 7, it illustrates a zoomed-in view of the solenoid 205 and the armature latch bar 8 of FIG. 6 according to an exemplary embodiment of the present invention.

In particular, FIG. 4 shows the breaker mechanism 400 in an ON position. FIG. 4 shows the breaker mechanism 400 and a close up view of the armature latch bar 202 in relation to a breaker trip bar 500 and the breaker armature 330. FIG. 6 shows the armature latch bar 202 and the solenoid plunger feature 230 interface.

Figure 8:
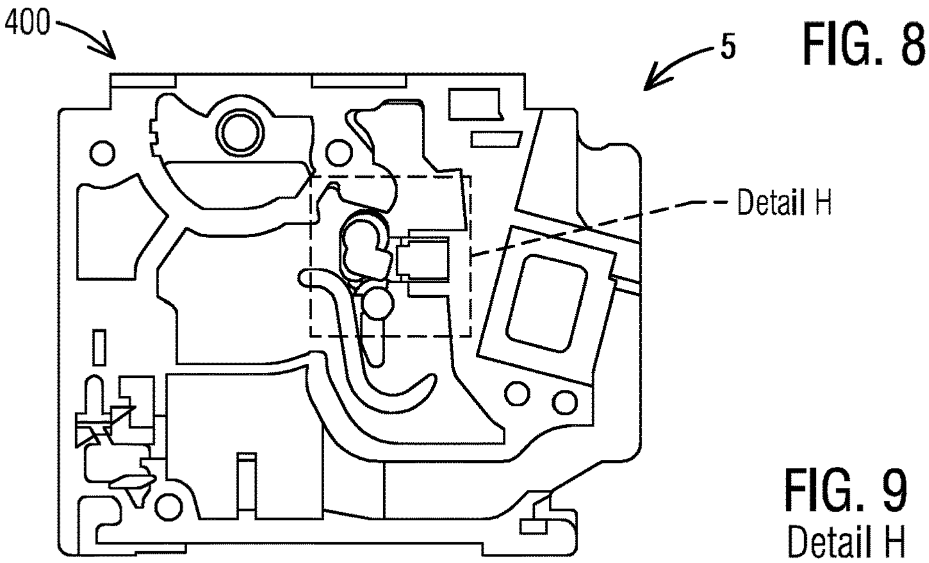
FIG. 8 illustrates a schematic view of a PCB switch not activated according to an exemplary embodiment of the present invention.
Figure 9:
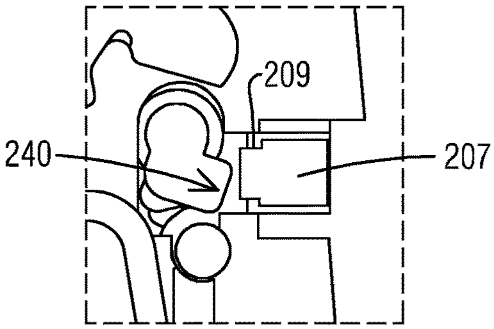
FIG. 9 illustrates a zoomed-in view of the PCB switch of FIG. 8 according to an exemplary embodiment of the present invention.

The third view shows the PCB switch 207 and interface with the breaker trip bar feature 240. FIG. 8 illustrates a schematic view of the PCB switch 207 not activated according to an exemplary embodiment of the present invention. FIG. 9 illustrates a zoomed-in view of the PCB switch 207 of FIG. 8 according to an exemplary embodiment of the present invention.

Figure 10:
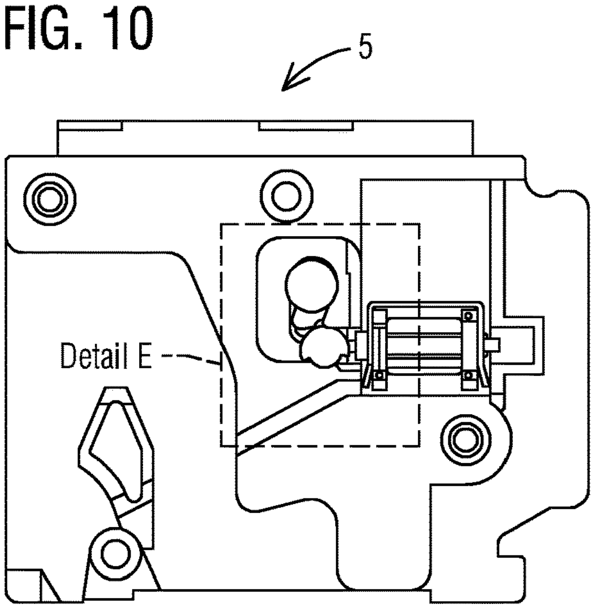
FIG. 10 illustrates a schematic view of an armature latch bar rotation stop according to an exemplary embodiment of the present invention.
Figure 11:
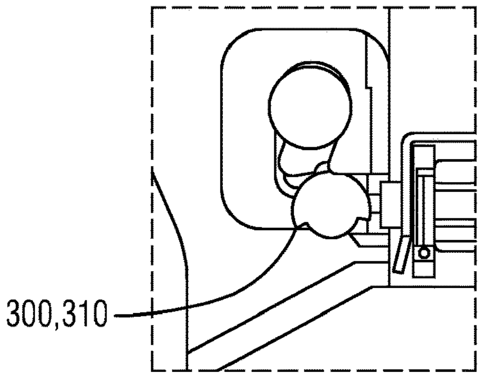
FIG. 11 illustrates a zoomed-in view of the armature latch bar rotation stop of FIG. 10 in an ON position according to an exemplary embodiment of the present invention.

The fourth view shows the interface of the rotational stop features (300 and 305) of the armature latch bar 202 with the left pole base stop features (310 and 315). FIG. 10 illustrates a schematic view of an armature latch bar rotation stop according to an exemplary embodiment of the present invention. FIG. 11 illustrates a zoomed-in view of the armature latch bar rotation stop of FIG. 10 in an ON position according to an exemplary embodiment of the present invention.

With reference to FIG. 5, the armature latch bar 202 and the breaker trip bar 500 are shown to the left of an armature surface **330*b*. In this position, the breaker trip bar 500 is not rotating the breaker armature 330 counter clockwise. A cradle latch surface 242*a* and an armature latching surface 330*a* overlap and allow a moveable contact arm with a contact to rotate clockwise and mate with a stationary terminal and a contact. The moveable contact rotates as the breaker handle 402 is rotated counter clockwise toward the ON position. When the breaker mechanism 400 is in the ON position, the PCB switch plunger 209 is not activated with the breaker trip bar feature 240 (see FIGS. 33, 35). Also, the armature latch bar feature 232 and the solenoid plunger feature 230 are not engaged. The breaker trip bar 500 includes a recessed feature (the breaker mechanism trip bar feature 260) to provide clearance with the armature latch bar feature 255 when the two-pole residential electronic circuit breaker 5 of FIG. 1 is in this position. As shown, the armature latch bar 202 rotation is limited to the armature latch bar feature 300 (see FIG. 11) and left pole base module stop feature 310. If the breaker handles 402 are moved from the ON to OFF positions, the cradle latch surface 242*a* and the armature latching surface 330*a*** do not disengage.

Referencing FIGS. 1-11, a multi-pole circuit breaker such as the 2-pole residential electronic circuit breaker 5 comprises the breaker mechanism 400 including the breaker armature 330. The 2-pole residential electronic circuit breaker 5 further comprises the breaker cradle 242. The 2-pole residential electronic circuit breaker 5 further comprises the armature latch bar 202 to prevent the breaker armature 330 from latching with the breaker cradle 242. The armature latch bar 202 includes the recessed feature 325 (see FIG. 3) that interfaces with the breaker armature 330. The armature latch bar 202 further includes the armature latching surface **330*a* that needs to be removed before the breaker mechanism 400 can be latched. The armature latch bar 202 further includes the armature latching lever 255 that prevents a rotation of the breaker armature 330**.

The 2-pole residential electronic circuit breaker 5 further comprises the breaker trip bar 500 that includes the recessed area or feature 260 to interface with the armature latch bar 202 via the armature latch bar feature or the armature latching lever 255. The 2-pole residential electronic circuit breaker 5 further comprises the breaker trip bar 500 that includes a surface or a feature **500*b* (see FIG. 13) to rotate the armature latch bar 202 clockwise during a trip event. The breaker trip bar 500 further includes a feature 240 (see FIG. 17) to activate the printed circuit board (PCB) switch 207**.

The 2-pole residential electronic circuit breaker 5 further comprises the printed circuit board (PCB) assembly 200 including an electronic circuitry to activate at least one of the solenoid 205 or a solenoid assembly and an electromagnet (not shown). The printed circuit board (PCB) assembly 200 includes an outer perimeter **200*a* (see FIG. 3) that is nested within a surrounding plastic geometry 200*b* (see FIG. 3**).

The 2-pole residential electronic circuit breaker 5 further comprises the breaker trip bar 500 and the solenoid 205 or a solenoid assembly that is activated when the breaker trip bar 500 is rotated to a maximum rotation. The solenoid 205 or the solenoid assembly includes a plunger or the solenoid plunger feature 230 with a smaller radius to engage with a surface or the feature 232 of the armature latch bar 202.

The LP base 15(1) of the 2-pole residential electronic circuit breaker 5 includes a first recessed area a left pole base module channel feature 217 (see FIG. 39) for the wire routing that is connected from a line terminal and to the printed circuit board (PCB) assembly 200.

The LP base 15(1) includes a second recessed area defined by the LP cover feature 212 (see FIG. 40) and a RP base feature **15(2)*b* (see FIG. 43) to capture the PCB assembly 200. The LP base 15(1) includes a plurality of stops 310 (see FIG. 41) to prevent the armature latch bar 202 rotation clockwise and/or counter clockwise. The 2-pole residential electronic circuit breaker 5 further comprises the right pole (RP) base 15(2) and the left pole (LP) cover 20(1) that include the set of journals 320(1), 320(2) for the set of armature latch bar posts 322(1-2) (see FIG. 3**) to rotate about a specific point.

The 2-pole residential electronic circuit breaker 5 further comprises the printed circuit board (PCB) switch 207 that is activated when the breaker trip bar feature 240 is rotated to a maximum rotation. The printed circuit board (PCB) switch 207 is momentarily activated during rotation of the breaker cradle 242 when the breaker handle 402 is rotated towards a reset position.

While the 2-pole residential electronic circuit breaker 5 is described here as a regular thermal/magnetic residential circuit breaker a range of other constructions of circuit breakers are also contemplated by the present invention. For example, a ground fault circuit interrupter (GFCI) and/or combination arc-fault circuit interrupting (CAFCI) two or three pole residential circuit breaker may be implemented based on one or more features presented above without deviating from the spirit of the present invention.

A ground fault circuit interrupter (GFCI), also called Ground Fault Interrupter (GFI) or Residual Current Device (RCD) is a device that shuts off an electric power circuit when it detects that current is flowing along an unintended path. A GFCI works by measuring the current leaving one side of a power source (the so-called "live" or "hot wire"), and comparing it to current returning on the other (the "neutral" side). If they are not equal, then some of the current must be leaking in an unwanted way, and the GFCI shuts the power off. After the problem is fixed, the device must be reset manually by pushing the reset button (the red button in the image shown at right). If the problem is not fixed, the GFCI will keep shutting off. GFCIs are available in two types for permanent installation: the circuit breaker type that installs in an electrical panel, and the receptacle type that installs in a normal electrical outlet box. GFCIs that attach to appliance cords, or are built in to extension cords, are also available. The CAFCI is a new version of the older ACFI breaker. An arc fault circuit interrupter (AFCI) is an advanced circuit breaker that, as a way to reduce electrical fire threats, breaks the circuit when it detects a dangerous electric arc in the circuit that it protects. Breakers designed to protect against parallel and series arcs are called Combination Arc-Fault Circuit Breakers. Both trip like a standard circuit breaker when the circuit is overloaded with too much current or there is a short circuit, and the AFCI also trips when there is parallel arcing (hot-to-neutral or an arc to ground) in the protected circuit.

Figure 12:
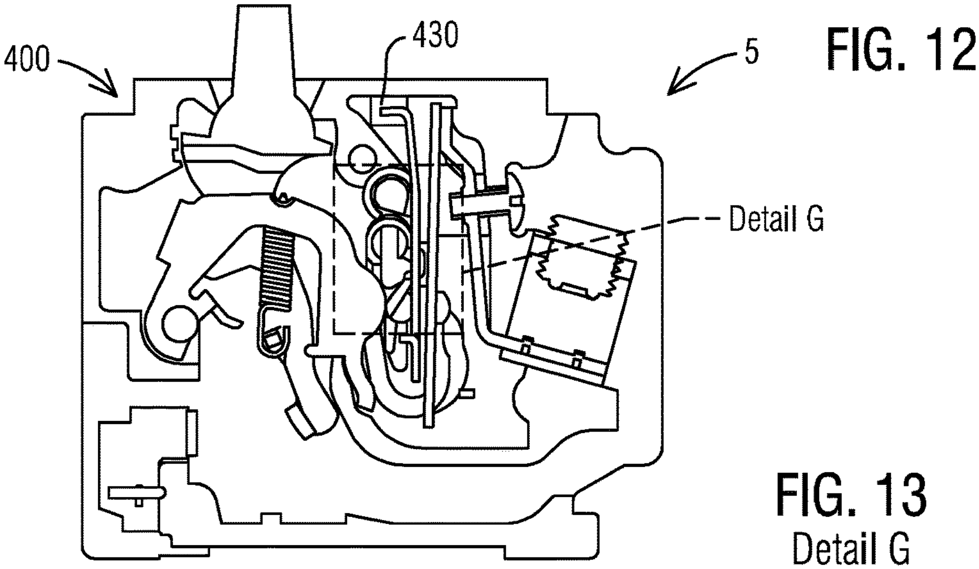
FIG. 12 illustrates a schematic view of the breaker mechanism of the two-pole residential electronic circuit breaker of FIG. 1 in a tripped position in accordance with an exemplary embodiment of the present invention.
Figure 13:
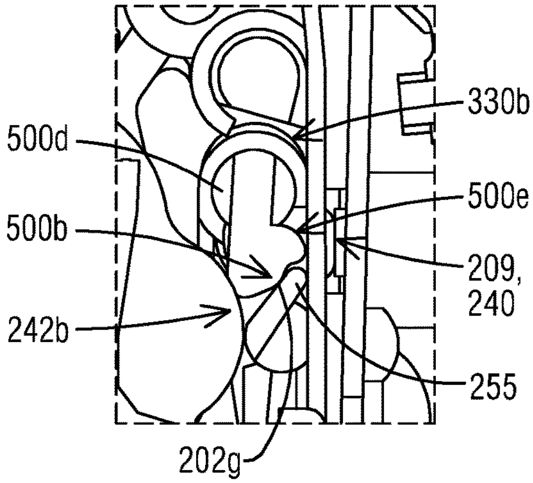
FIG. 13 illustrates a zoomed-in view of the breaker mechanism of the two-pole residential electronic circuit breaker of FIG. 1 in the tripped position in accordance with an exemplary embodiment of the present invention.
Figure 14:
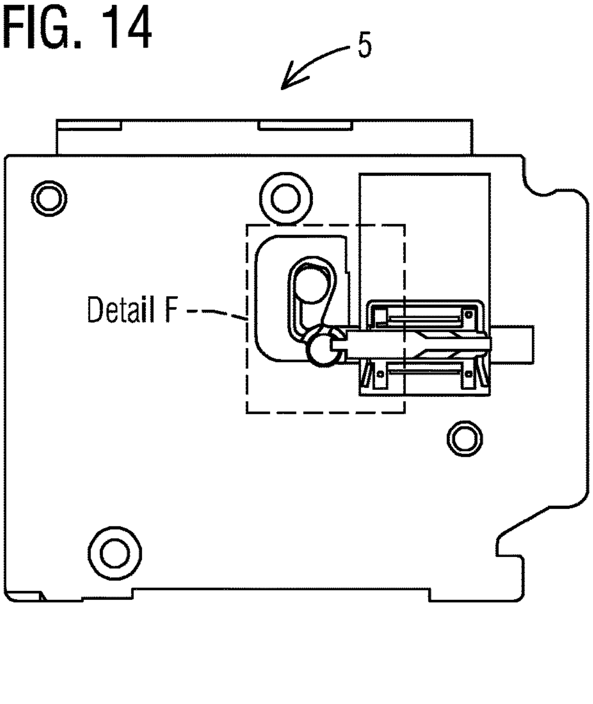
FIG. 14 illustrates a schematic view of a solenoid and an armature latch bar shown latched in accordance with an exemplary embodiment of the present invention.
Figure 15:
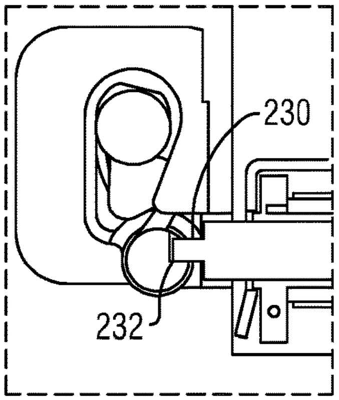
FIG. 15 illustrates a zoomed-in view of the solenoid and the armature latch bar of FIG. 14 according to an exemplary embodiment of the present invention.

FIG. 12 illustrates a schematic view of the breaker mechanism 400 of the two-pole residential electronic circuit breaker 5 of FIG. 1 in a tripped position in accordance with an exemplary embodiment of the present invention. FIG. 13 illustrates a zoomed-in view of the breaker mechanism 400 of the two-pole residential electronic circuit breaker 5 of FIG. 1 in the tripped position in accordance with an exemplary embodiment of the present invention. FIG. 14 illustrates a schematic view of the solenoid 205 and the armature latch bar 202 shown latched in accordance with an exemplary embodiment of the present invention. FIG. 15 illustrates a zoomed-in view of the solenoid 205 and the armature latch bar 202 of FIG. 14 according to an exemplary embodiment of the present invention.

Figure 16:
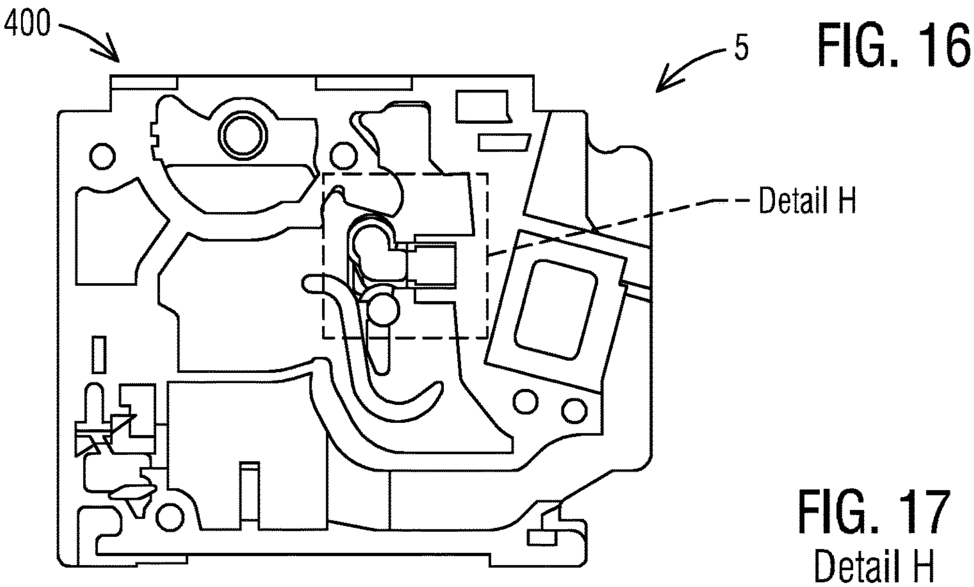
FIG. 16 illustrates a schematic view of a PCB switch not activated according to an exemplary embodiment of the present invention.
Figure 17:
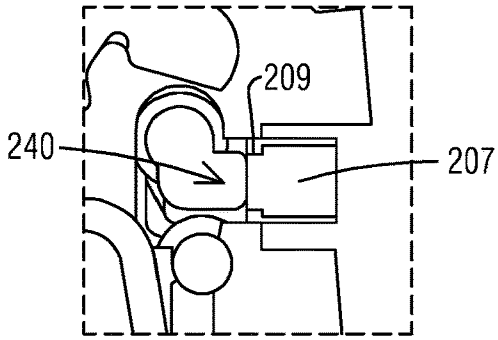
FIG. 17 illustrates a zoomed-in view of the PCB switch of FIG. 16 according to an exemplary embodiment of the present invention.
Figure 18:
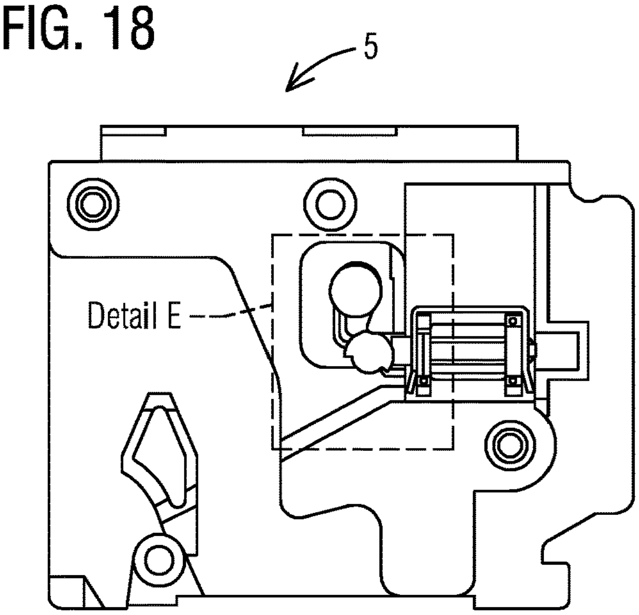
FIG. 18 illustrates a schematic view of an armature latch bar rotation stop not engaged in a trip position according to an exemplary embodiment of the present invention.
Figure 19:
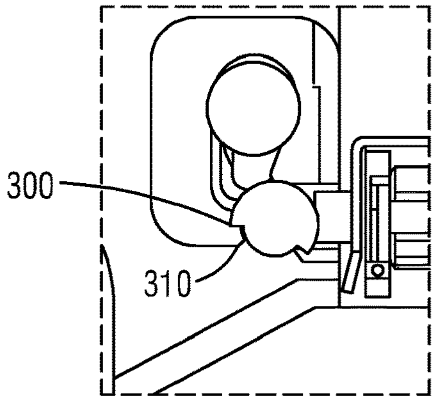
FIG. 19 illustrates a zoomed-in view of the armature latch bar rotation stop not engaged in the trip position according to an exemplary embodiment of the present invention.

FIG. 16 illustrates a schematic view of the PCB switch 207 not activated according to an exemplary embodiment of the present invention. FIG. 17 illustrates a zoomed-in view of the PCB switch 207 of FIG. 16 according to an exemplary embodiment of the present invention. FIG. 18 illustrates a schematic view of an armature latch bar rotation stop not engaged in a trip position according to an exemplary embodiment of the present invention. FIG. 19 illustrates a zoomed-in view of the armature latch bar rotation stop not engaged in the trip position according to an exemplary embodiment of the present invention.

Referencing FIGS. 12-19, a multi-pole circuit breaker such as the 2-pole residential electronic circuit breaker 5 comprises the breaker mechanism 400 that is shown in a tripped position. The breaker mechanism 400 changes a state from the ON position to the tripped position due to a trip event. A trip event could be from an overload condition or an increased instantaneous level. In both cases, the breaker armature 330 rotates counter clockwise and decreases the latch engagement between the cradle latch surface 242*a* (see FIG. 5) and the armature latching surface 330*a* (see FIG. 5). Once the latch engagement reduces enough, the breaker cradle 242 rotates clockwise and the moveable contact arm with contact 425 (see FIG. 4) rotates counter clockwise. The cradle latch surface 242*a* and the armature latching surface 330*a* do not overlap and the main contacts are separated. As the breaker cradle 242 rotates clockwise, a cradle feature 242*b* (see FIG. 13) rotates the breaker trip bar 500 counter clockwise by pushing against a feature 500*d* (see FIG. 13) of the breaker trip bar 500. As the breaker trip bar 500 rotates, the feature 500*b* (see FIG. 13) rotates the armature latch bar 202 clockwise by pushing on an armature latch bar feature 202*g* (see FIG. 13). The breaker trip bar feature 500*e* (see FIG. 13) pushes against the armature surface 330*b* (see FIG. 13). An internal solenoid spring (not shown) is included that naturally biases the solenoid plunger or the solenoid plunger feature 230 to the left (shown in this view). As the armature latch bar 202 rotates clockwise, the solenoid plunger or the solenoid plunger feature 230 engages with an armature latch bar feature or surface 232 (see FIG. 15). This prevents the armature latch bar 202 from rotating counter clockwise until the solenoid plunger or the solenoid plunger feature 230 is activated to disengage the two surfaces. The PCB switch plunger 209 is not activated by the breaker trip bar feature 240 (see FIG. 17) in this position. As the breaker cradle 242 rotates clockwise and before it stops as shown, the cradle feature 242*b* (see FIG. 13) passes the max rotation of the breaker trip bar 500 as shown below in FIGS. 12-19. In this scenario, a time delay may be needed after power has been lost before the PCB switch 207 activates and triggers the solenoid 205. Otherwise, the solenoid 205 is triggered and the armature latch bar 202 is not locked with the solenoid plunger or the solenoid plunger feature 230.

FIG. 20 illustrates a schematic view of the breaker mechanism 400 shown between a trip position and a reset position with maximum rotation of the breaker trip bar 500 and maximum rotation of the armature latch bar 202 in accordance with an exemplary embodiment of the present invention. FIG. 21 illustrates a zoomed-in view of the breaker mechanism 400 shown of FIG. 20 in accordance with an exemplary embodiment of the present invention. FIG. 22 illustrates a schematic view of the solenoid 205 and the armature latch bar 202 shown latched in accordance with an exemplary embodiment of the present invention. FIG. 23 illustrates a zoomed-in view of the solenoid 205 and the armature latch bar 202 of FIG. 22 according to an exemplary embodiment of the present invention.

Figure 24:
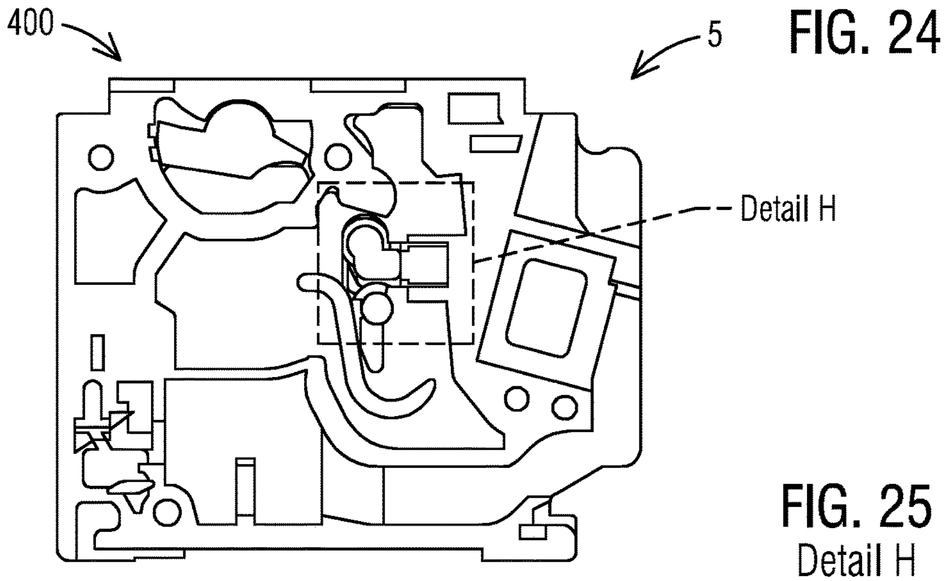
FIG. 24 illustrates a schematic view of a PCB switch activated according to an exemplary embodiment of the present invention.
Figure 25:
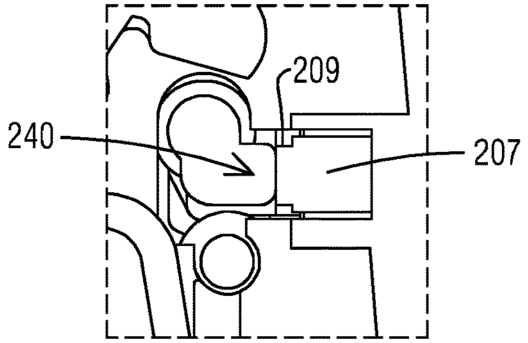
FIG. 25 illustrates a zoomed-in view of the PCB switch of FIG. 24 according to an exemplary embodiment of the present invention.
Figure 26:
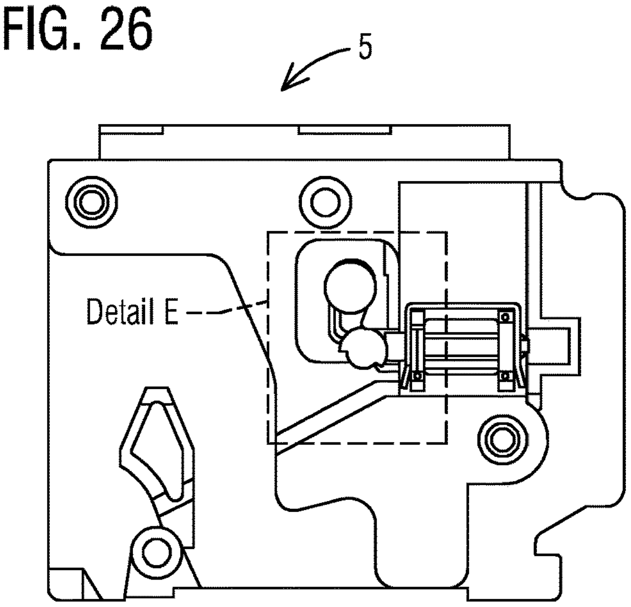
FIG. 26 illustrates a schematic view of an armature latch bar rotation near a reset stop according to an exemplary embodiment of the present invention.
Figure 27:
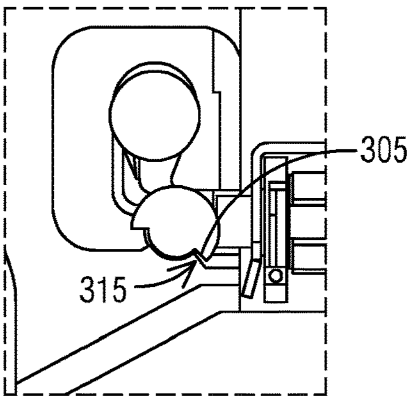
FIG. 27 illustrates a zoomed-in view of the armature latch bar rotation near the reset stop according to an exemplary embodiment of the present invention.

FIG. 24 illustrates a schematic view of the PCB switch 207 activated according to an exemplary embodiment of the present invention. FIG. 25 illustrates a zoomed-in view of the PCB switch 207 of FIG. 24 according to an exemplary embodiment of the present invention. FIG. 26 illustrates a schematic view of the armature latch bar 202 rotation near a reset stop according to an exemplary embodiment of the present invention. FIG. 27 illustrates a zoomed-in view of the armature latch bar 202 rotation near the reset stop according to an exemplary embodiment of the present invention.

Referencing FIGS. 20-27, a multi-pole circuit breaker such as the 2-pole residential electronic circuit breaker 5 comprises the breaker mechanism 400 that is shown between the OFF and tripped positions. The breaker cradle 242 is rotated counter clockwise to the maximum rotation of the breaker trip bar 500. As the breaker handle 402 is rotated counter clockwise toward the OFF position, the breaker cradle 242 rotates counter clockwise. The cradle feature 242*b* (see FIG. 13) pushes against the breaker trip bar feature 240 (see FIG. 17). This rotates the breaker trip bar 500 counter clockwise. The breaker trip bar feature 240 (see FIG. 17) pushes against the armature latch bar feature 202*g* (see FIG. 13). As the armature latch bar 202 rotates clockwise, the force between the armature latch bar feature or surface 232 (see FIG. 15) and the solenoid plunger or the solenoid plunger feature 230 is decreased. Once the breaker trip bar 500 has rotated near the max position, the PCB switch plunger 209 is activated by breaker trip bar feature 240. This initiates a self test. In the event that the self test passes, the solenoid plunger or the solenoid plunger feature 230 is activated and moves toward the right. The solenoid plunger or the solenoid plunger feature 230 disengages with the armature latch bar feature or surface 232 (see FIG. 15). The breaker armature spring 430 rotates the breaker armature 330 clockwise and in turn rotates the armature latch bar 202 counter clockwise and the breaker trip bar 500 clockwise. As the breaker handle 402 continues to rotate toward the OFF position, the breaker cradle 242 continues to rotate counter clockwise. The cradle latch surface 242*a* (see FIG. 5) passes the armature latching surface 330*a* (see FIG. 5). As the breaker handle 402 is rotated from the OFF position towards the ON position, the breaker cradle 242 rotates clockwise. The cradle latch surface 242*a* (see FIG. 5) engages with the armature latching surface 330*a* (see FIG. 5) (as shown in FIGS. 12-19). As the breaker handle 402 continues to rotate toward the ON position, the moveable contact arm with contact 425 closes with the stationary line terminal with contact 427. If the self test does not pass, the solenoid plunger or the solenoid plunger feature 230 is not activated and the armature latch bar 202 remains in the same position (as shown). Therefore the breaker armatures 330 are not allowed to rotate clockwise and the cradle latch surface 242*a* cannot engage with the armature latching surface 330*a*. These events prevent the main contacts from touching. The armature latch bar 202 rotation is limited to an armature bar feature 305 (see FIG. 31) and left pole base stop feature 315 (see FIG. 3). This process can be repeated if needed by rotating the breaker handle 402 from the tripped to OFF position. Another self test may be conducted and this process repeated.

Figure 28:
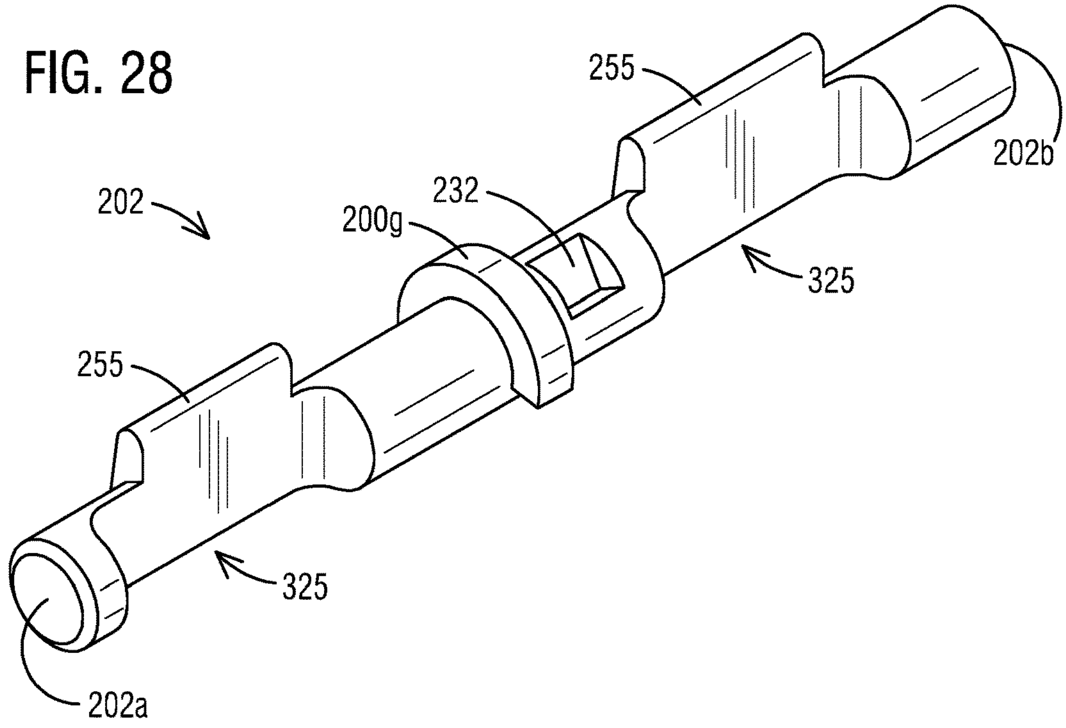
FIG. 28 illustrates a perspective view of an armature latch bar for a 2 and/or 3 pole circuit breaker according to an exemplary embodiment of the present invention.

FIG. 28 illustrates a perspective view of the armature latch bar 202 for a 2 and/or 3 pole circuit breaker such as the 2-pole residential electronic circuit breaker 5 according to an exemplary embodiment of the present invention. The armature latch bar 202 comprises the first and second ends 202*a* and 202*b* which are captured in the outer module base feature 245 and the cover feature 250 (see FIG. 46 and FIG. 3 respectively). The armature latch bar 202 further comprises the armature latch bar feature 255 which interfaces with the breaker mechanism trip bar feature 260 (see FIG. 35). The armature latch bar 202 further includes the recessed surface 325 to provide a clearance for the breaker armature 330 within each module 10. The armature latch bar 202 further includes the armature latch bar feature 202*g*. The armature latch bar 202 further includes the armature latch bar feature 232.

Figure 29:
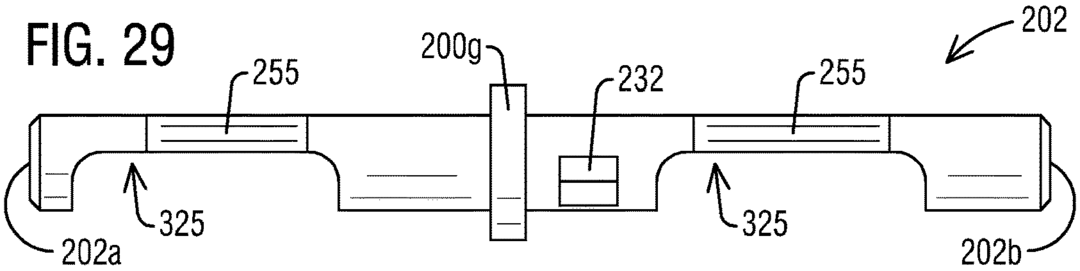
FIG. 29 illustrates a top view of the armature latch bar of FIG. 28 according to an exemplary embodiment of the present invention.
Figure 30:
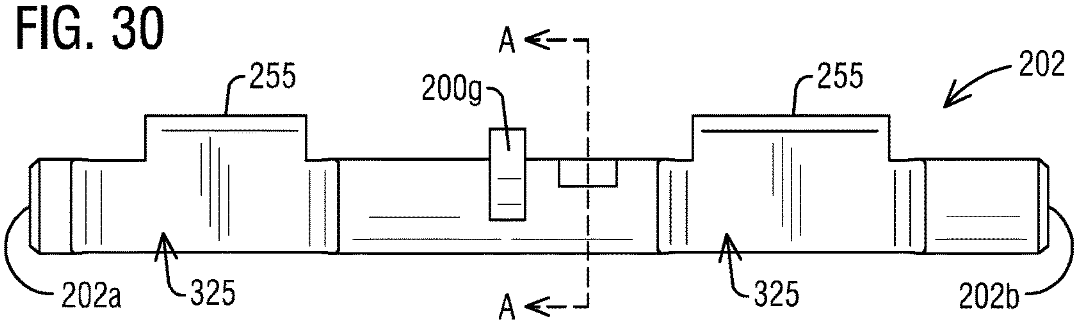
FIG. 30 illustrates a front view of the armature latch bar of FIG. 28 according to an exemplary embodiment of the present invention.

FIG. 29 illustrates a top view of the armature latch bar 202 of FIG. 28 according to an exemplary embodiment of the present invention. FIG. 30 illustrates a front view of the armature latch bar 202 of FIG. 28 according to an exemplary embodiment of the present invention.

Figure 31:
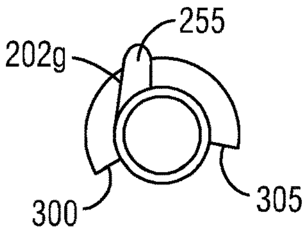
FIG. 31 illustrates a side view of the armature latch bar of FIG. 28 according to an exemplary embodiment of the present invention.

FIG. 31 illustrates a side view of the armature latch bar 202 of FIG. 28 according to an exemplary embodiment of the present invention. The armature latch bar 202 includes rotational stop features (300 and 305) that interface with the base stop features (310 and 315). The armature latch bar 202 further includes the armature latch bar feature 202*g* so as the breaker trip bar 500 rotates, the feature 500*b* rotates the armature latch bar 202 clockwise by pushing on the armature latch bar feature 202*g*.

Figure 32:
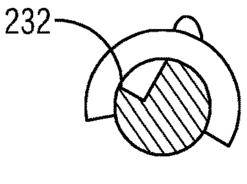
FIG. 32 illustrates a cross-sectional view of the armature latch bar of FIG. 28 at a line A-A in FIG. 30 according to an exemplary embodiment of the present invention.

FIG. 32 illustrates a cross-sectional view of the armature latch bar 202 of FIG. 28 at a line A-A in FIG. 30 according to an exemplary embodiment of the present invention. The armature latch bar 202 includes the armature latch bar feature 232 in that the solenoid plunger feature 230 (see FIGS. 3, 48) interfaces with the armature latch bar feature 232.

FIG. 33 illustrates a perspective view of the breaker trip bar 500 for a 2 and/or 3 pole circuit breaker such as the 2-pole residential electronic circuit breaker 5 according to an exemplary embodiment of the present invention. The breaker trip bar 500 includes the breaker trip bar feature 240 that interfaces with the PCB switch 207. It activates the PCB switch 207 by triggering it. This activation sends a signal to the solenoid 205 or the solenoid assembly. The breaker trip bar 500 includes the breaker mechanism trip bar feature 260. The armature latch bar feature 255 (see FIG. 30) interfaces with the breaker mechanism trip bar feature 260. The breaker trip bar 500 includes the recessed feature (the breaker mechanism trip bar feature 260) to provide clearance with the armature latch bar feature 255. The breaker trip bar 500 further includes the feature 500*d*. As the breaker cradle 242 rotates counterclockwise, the cradle feature 242*b* (see FIG. 13) rotates the breaker trip bar 500 counter clockwise by pushing against the feature 500*d*. The breaker trip bar 500 further includes the breaker trip bar feature 240. The cradle feature 242*b* (see FIG. 13) pushes against the breaker trip bar feature 240. This rotates the breaker trip bar 500 counter clockwise. The breaker trip bar feature 240 pushes against the armature latch bar feature 202*g* (see FIG. 13). The breaker trip bar 500 further includes the breaker trip bar feature 500*e*. The breaker trip bar feature 500*e* pushes against the armature surface 330*b* (see FIG. 13).

FIG. 34 illustrates a front view of the breaker trip bar 500 of FIG. 33 according to an exemplary embodiment of the present invention. FIG. 35 illustrates a side view of the breaker trip bar 500 of FIG. 33 according to an exemplary embodiment of the present invention.

Figure 36:
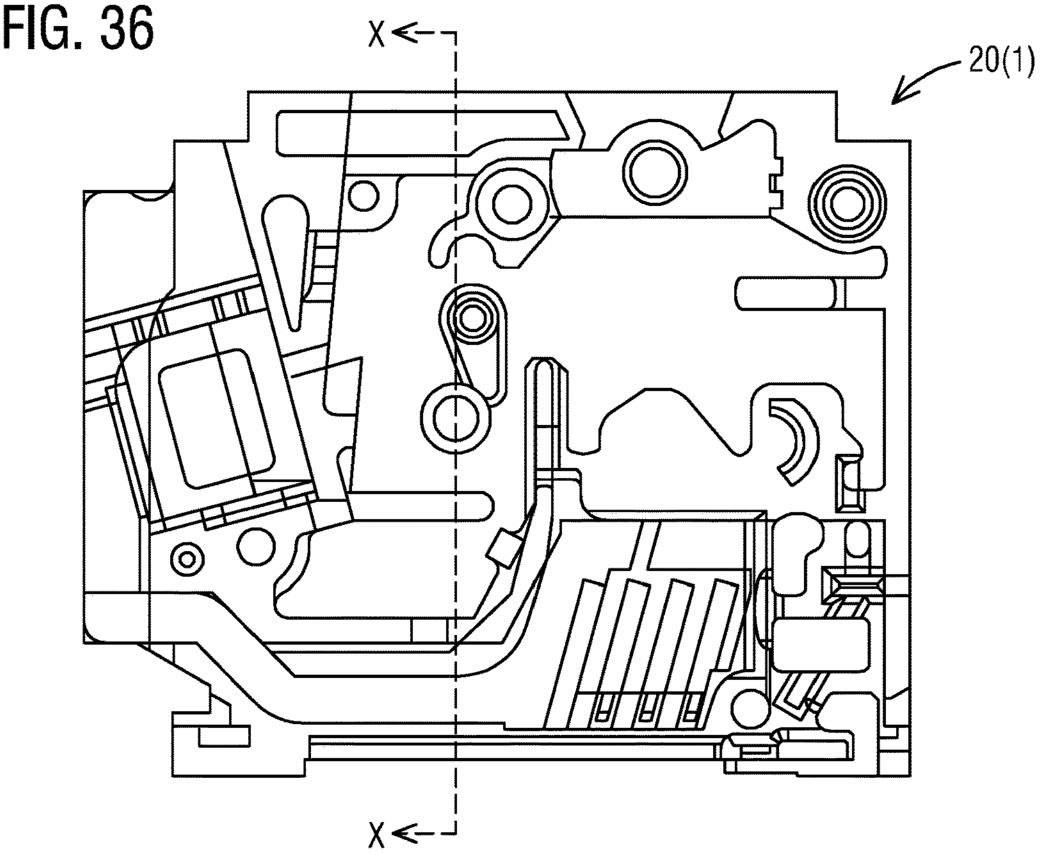
FIG. 36 illustrates a front view of a left pole (LP) cover of a 2 and/or 3 pole circuit breaker according to an exemplary embodiment of the present invention.
Figure 37:
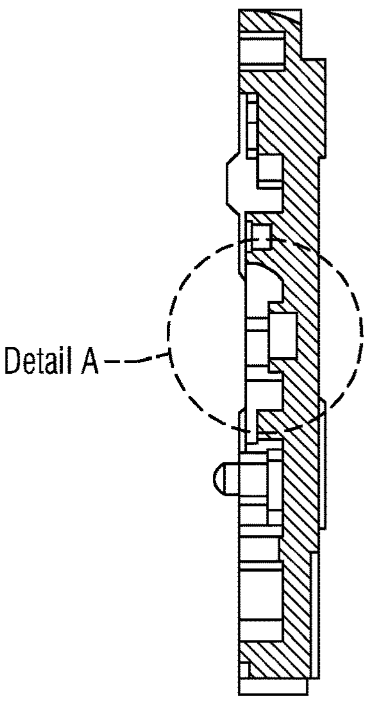
FIG. 37 illustrates a cross-sectional view of the left pole (LP) cover of FIG. 36 at a line X-X according to an exemplary embodiment of the present invention.
Figure 38:
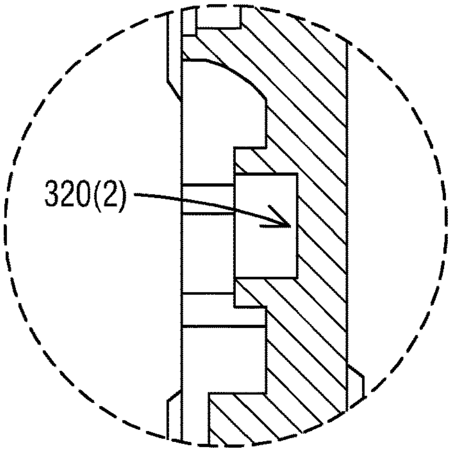
FIG. 38 illustrates a view of detail A of the left pole (LP) cover of FIG. 37 according to an exemplary embodiment of the present invention.

FIG. 36 illustrates a front view of the left pole (LP) cover 20(1) of a 2 and/or 3 pole circuit breaker such as the 2-pole residential electronic circuit breaker 5 according to an exemplary embodiment of the present invention. FIG. 37 illustrates a cross-sectional view of the left pole (LP) cover 20(1) of FIG. 36 at a line X-X according to an exemplary embodiment of the present invention. FIG. 38 illustrates a view of detail A of the left pole (LP) cover 20(1) of FIG. 37 according to an exemplary embodiment of the present invention. The journal 320(2) in the cover 20(1) of the left pole module 10(1) is provided to capture the end of the armature latch bar 202*a*.

Figure 39:
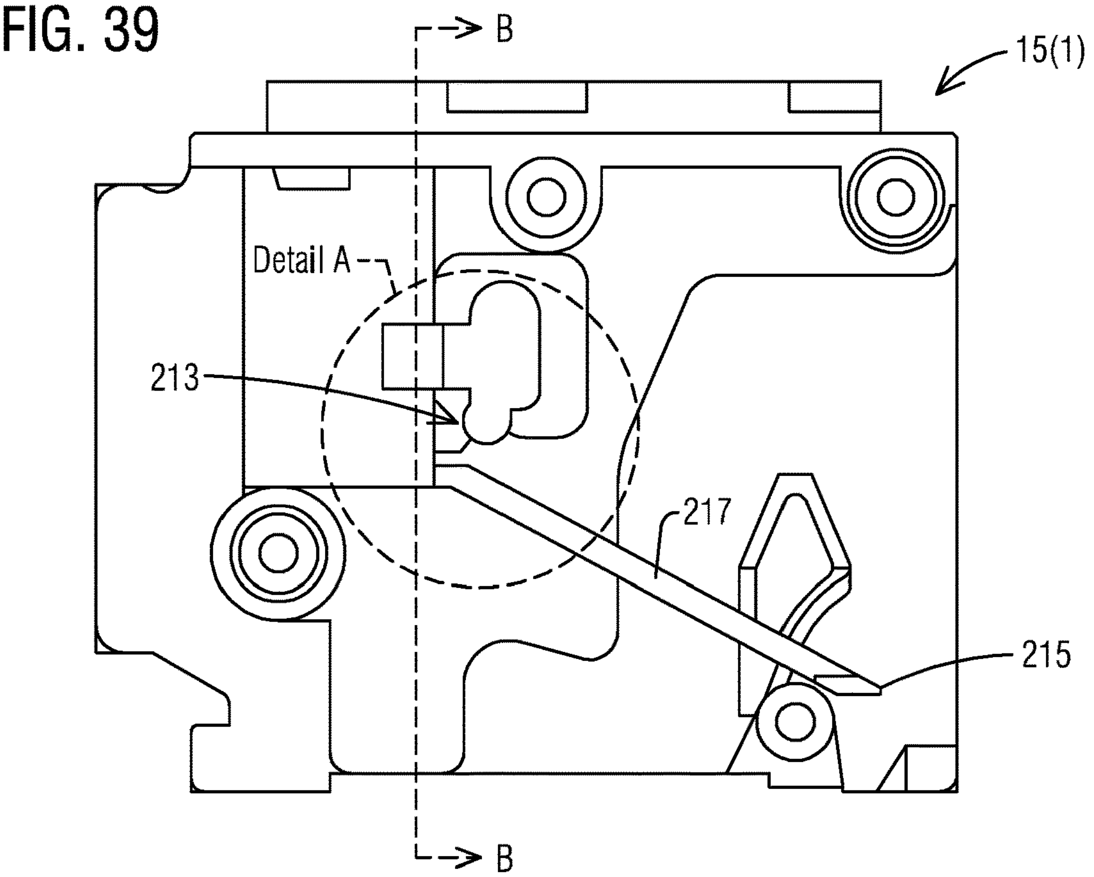
FIG. 39 illustrates a front view of a left pole (LP) base of a 2 and/or 3 pole circuit breaker according to an exemplary embodiment of the present invention.

FIG. 39 illustrates a front view of the left pole (LP) base 15(1) of a 2 and/or 3 pole circuit breaker such as the 2-pole residential electronic circuit breaker 5 according to an exemplary embodiment of the present invention. The left pole (LP) base 15(1) includes the base feature 215 and the channel feature 217. Power to the PCB assembly 200 is connected through a wire (not shown) from the stationary line terminals and through the base 15(1) feature 215 of the left module 10(1). The wires are routed through the channel feature 217 of the base 15(1) of the left module 10(1). The left pole (LP) base 15(1) further includes the compartment 211. The compartment 211 in the left pole base 15(1) provides space for the PCB switch 207 to interface with the breaker trip bar feature 240 (see FIG. 34). The left pole (LP) base 15(1) further includes a base feature compartment 213.

Figure 40:
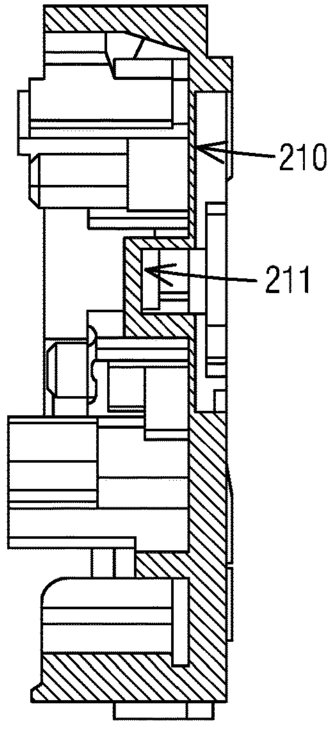
FIG. 40 illustrates a cross-sectional view of the left pole (LP) base of FIG. 39 at a line B-B according to an exemplary embodiment of the present invention.

FIG. 40 illustrates a cross-sectional view of the left pole (LP) base 15(1) of FIG. 39 at a line B-B according to an exemplary embodiment of the present invention. The PCB assembly 200 is captured between the base feature 210 of the left module 10(1) and the cover feature 212 of the right module 10(2).

Figure 41:
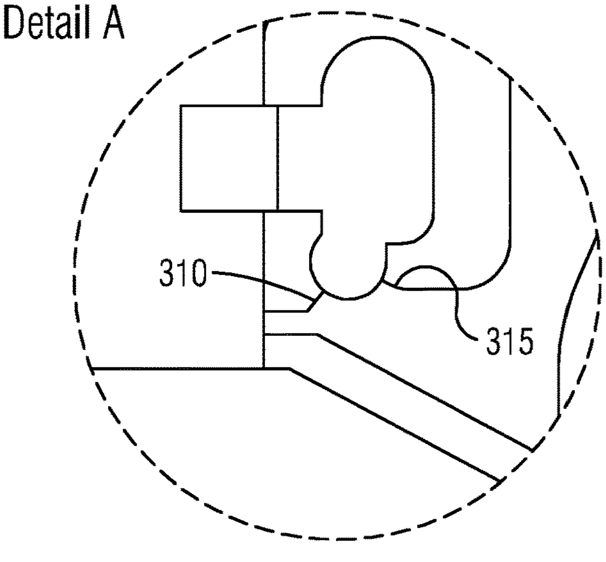
FIG. 41 illustrates a view of detail A of the left pole (LP) base of FIG. 39 according to an exemplary embodiment of the present invention.

FIG. 41 illustrates a view of detail A of the left pole (LP) base 15(1) of FIG. 39 according to an exemplary embodiment of the present invention. The left pole (LP) base 15(1) further includes the left pole base stop features (310 and 315). The left pole base stop features (310 and 315) interface with the rotational stop features (300 and 305) of the armature latch bar 202.

Figure 42:
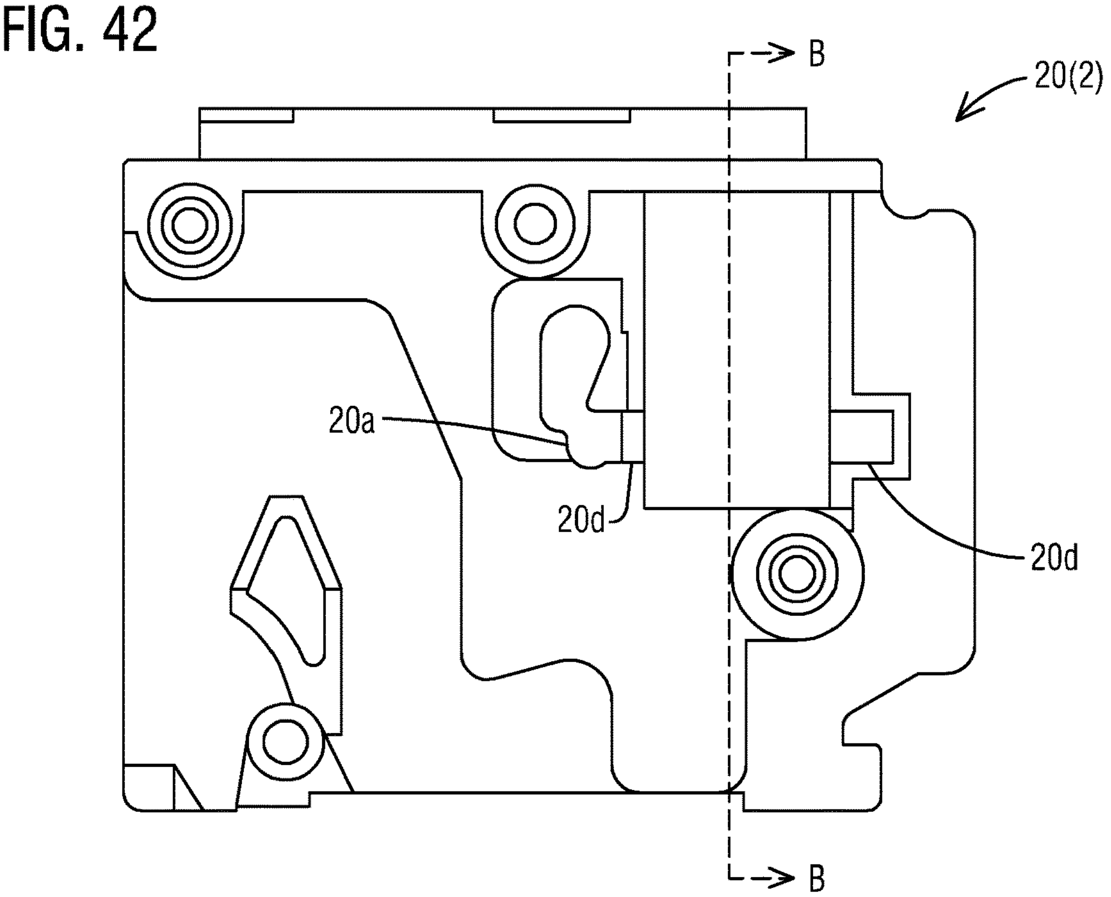
FIG. 42 illustrates a front view of a right pole (RP) cover of a 2 and/or 3 pole circuit breaker according to an exemplary embodiment of the present invention.

FIG. 42 illustrates a front view of the right pole (RP) cover 20(2) of a 2 and/or 3 pole circuit breaker such as the 2-pole residential electronic circuit breaker 5 according to an exemplary embodiment of the present invention. The right pole (RP) cover 20(2) includes features 20*a* and 20*d*. The feature 20*a* is a clearance for the diameter of the armature latch bar 202. The features 20*d* allow a clearance for the solenoid plunger or the solenoid plunger feature 230 to slide in the horizontal direction.

Figure 43:
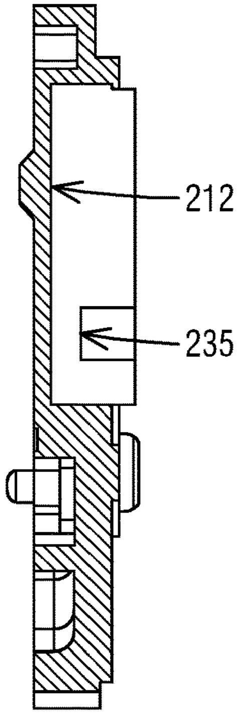
FIG. 43 illustrates a cross-sectional view of the right pole (RP) cover of FIG. 42 at a line B-B according to an exemplary embodiment of the present invention.

FIG. 43 illustrates a cross-sectional view of the right pole (RP) cover 20(2) of FIG. 42 at a line B-B according to an exemplary embodiment of the present invention. In particular, the PCB assembly 200 is captured between the base feature 210 of the left pole (LP) base 15(1) and the cover feature 212 of the right pole (RP) cover 20(2). The right pole cover 20(2) includes the recess feature 235 to provide clearance for a solenoid plunger or the solenoid plunger feature 230.

Figure 44:
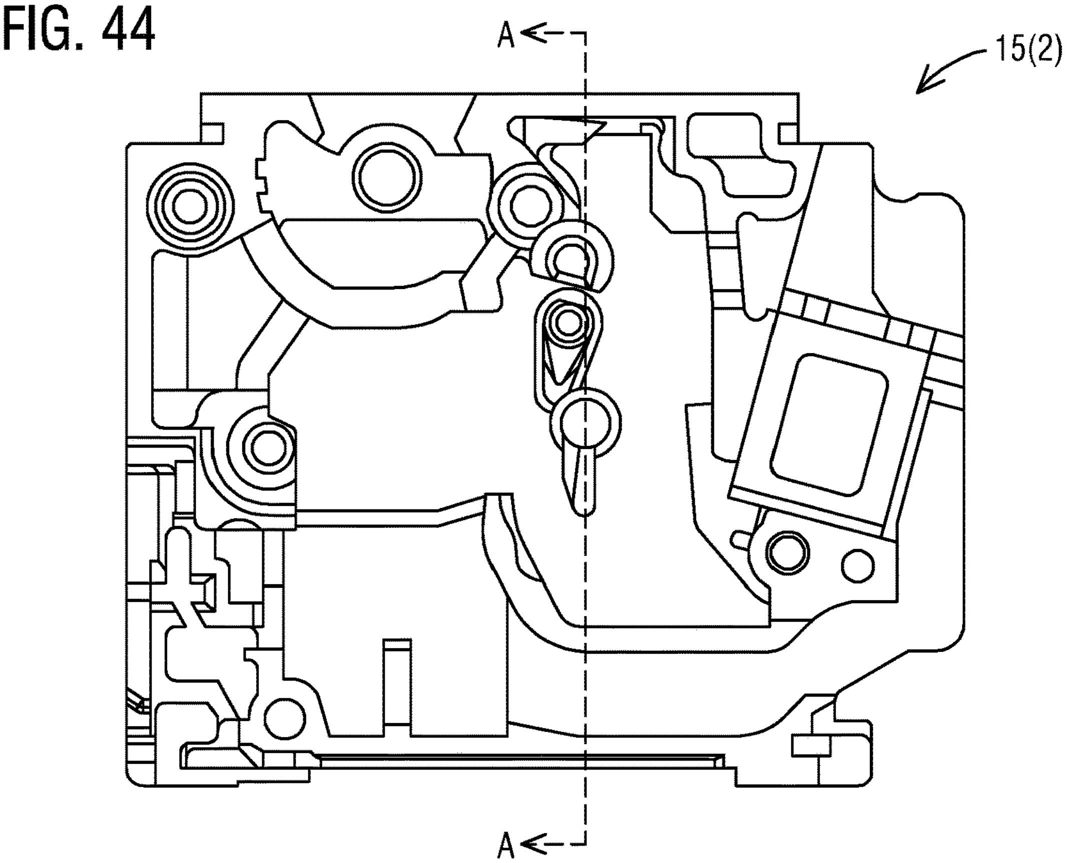
FIG. 44 illustrates a front view of a right pole (RP) base of a 2 and/or 3 pole circuit breaker according to an exemplary embodiment of the present invention.
Figure 45:
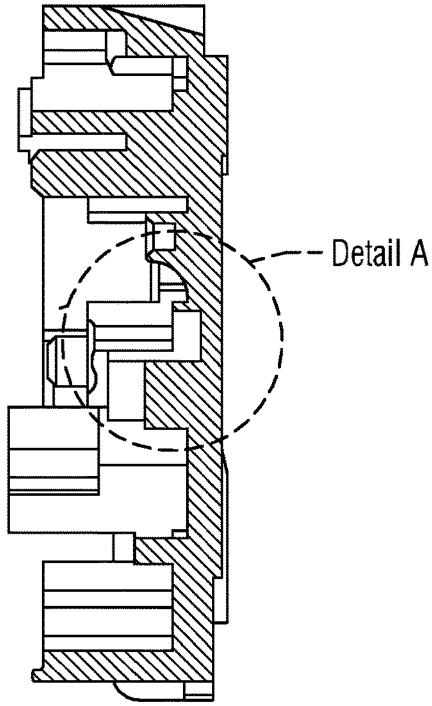
FIG. 45 illustrates a cross-sectional view of the right pole (RP) base of FIG. 44 at a line A-A according to an exemplary embodiment of the present invention.

FIG. 44 illustrates a front view of the right pole (RP) base 15(2) of a 2 and/or 3 pole circuit breaker such as the 2-pole residential electronic circuit breaker 5 according to an exemplary embodiment of the present invention. FIG. 45 illustrates a cross-sectional view of the right pole (RP) base 15(2) of FIG. 44 at a line A-A according to an exemplary embodiment of the present invention.

Figure 46:
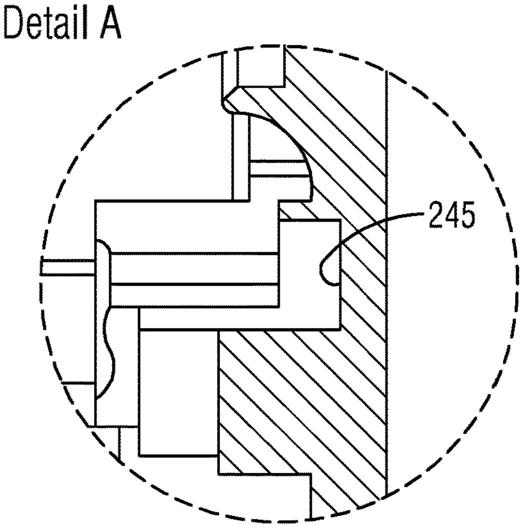
FIG. 46 illustrates a view of detail A of right pole (RP) base of FIG. 45 according to an exemplary embodiment of the present invention.

FIG. 46 illustrates a view of detail A of the right pole (RP) base 15(2) of FIG. 45 according to an exemplary embodiment of the present invention. The right pole (RP) base 15(2) includes the outer module base feature 245. Each end of the armature latch bar 202*a* and 202*b* (see FIG. 29) is captured in the outer module base feature 245 and a cover feature 250 (see FIG. 46 and FIG. 3 respectively).

Figure 47:
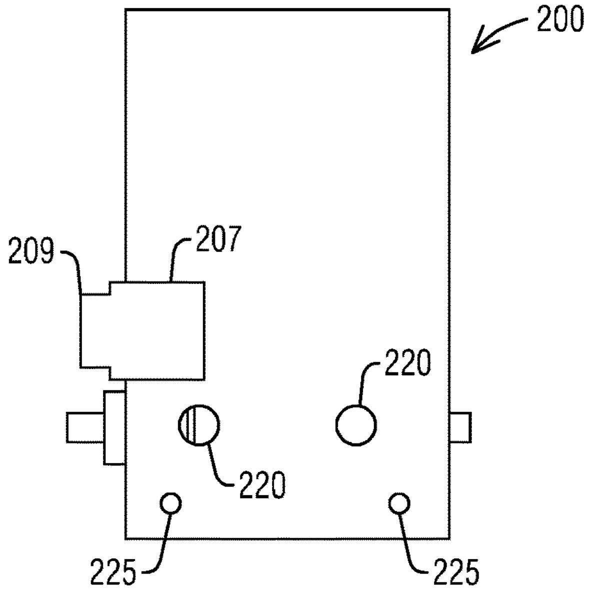
FIG. 47 illustrates a view of a first side of a printed circuit board (PCB) assembly of a 2 and/or 3 pole circuit breaker according to an exemplary embodiment of the present invention.
Figure 48:
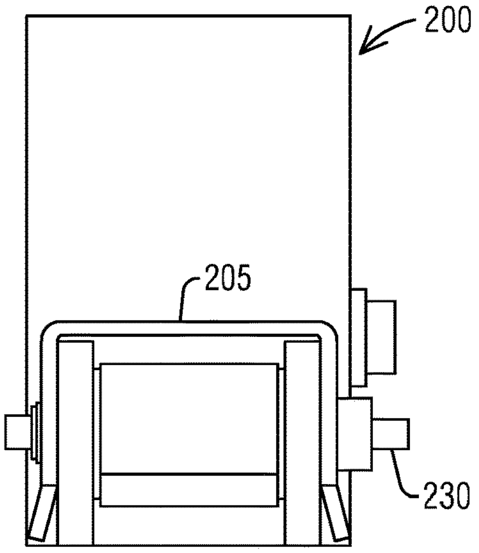
FIG. 48 illustrates a view of a second side of the printed circuit board (PCB) assembly of FIG. 47 according to an exemplary embodiment of the present invention.

FIG. 47 illustrates a view of a first side of the printed circuit board (PCB) assembly 200 of a 2 and/or 3 pole circuit breaker such as the 2-pole residential electronic circuit breaker 5 according to an exemplary embodiment of the present invention. The PCB assembly 200 includes the PCB switch 207, the PCB switch plunger 209, the PCB connections 220 and the PCB holes 225. The opposite ends of the wires are connected to the PCB connections 220. The solenoid pins 222 (see FIG. 49) are inserted and soldered to the PCB holes 225. FIG. 48 illustrates a view of a second side of the printed circuit board (PCB) assembly of FIG. 47 according to an exemplary embodiment of the present invention. The solenoid 205 and the solenoid plunger feature 230 are shown.

Figure 49:
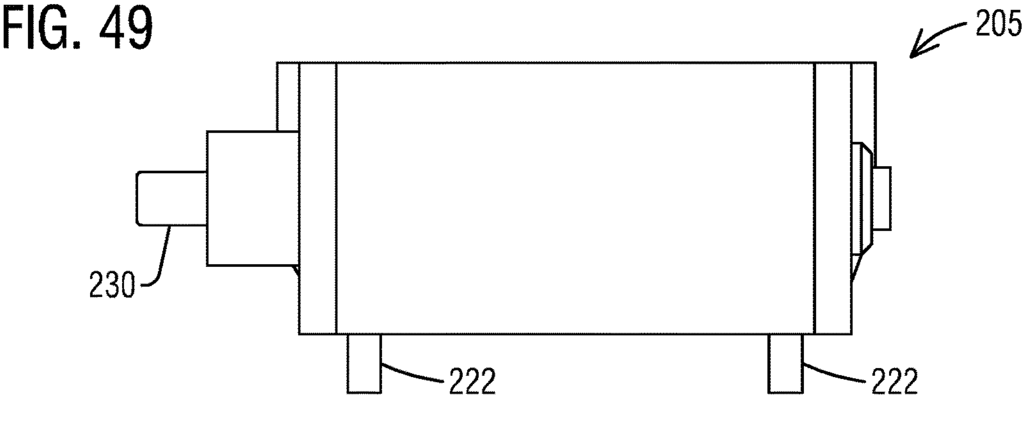
FIG. 49 illustrates a view of a first side of a solenoid of a 2 and/or 3 pole circuit breaker according to an exemplary embodiment of the present invention.
Figure 50:
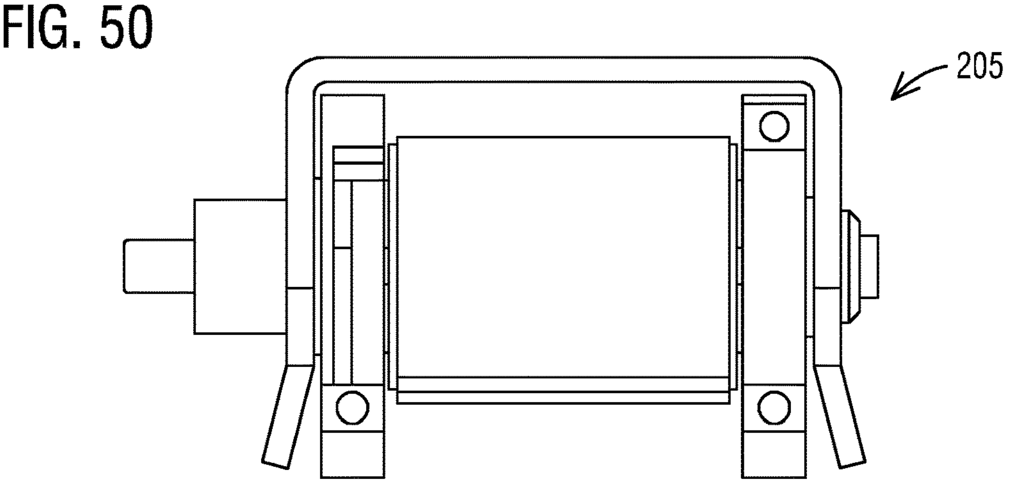
FIG. 50 illustrates a view of a second side of the solenoid of FIG. 49 according to an exemplary embodiment of the present invention.

FIG. 49 illustrates a view of a first side of the solenoid 205 of a 2 and/or 3 pole circuit breaker according to an exemplary embodiment of the present invention. The solenoid 205 includes the solenoid pins 222. FIG. 50 illustrates a view of a second side of the solenoid 205 of FIG. 49 according to an exemplary embodiment of the present invention.

Figure 51:
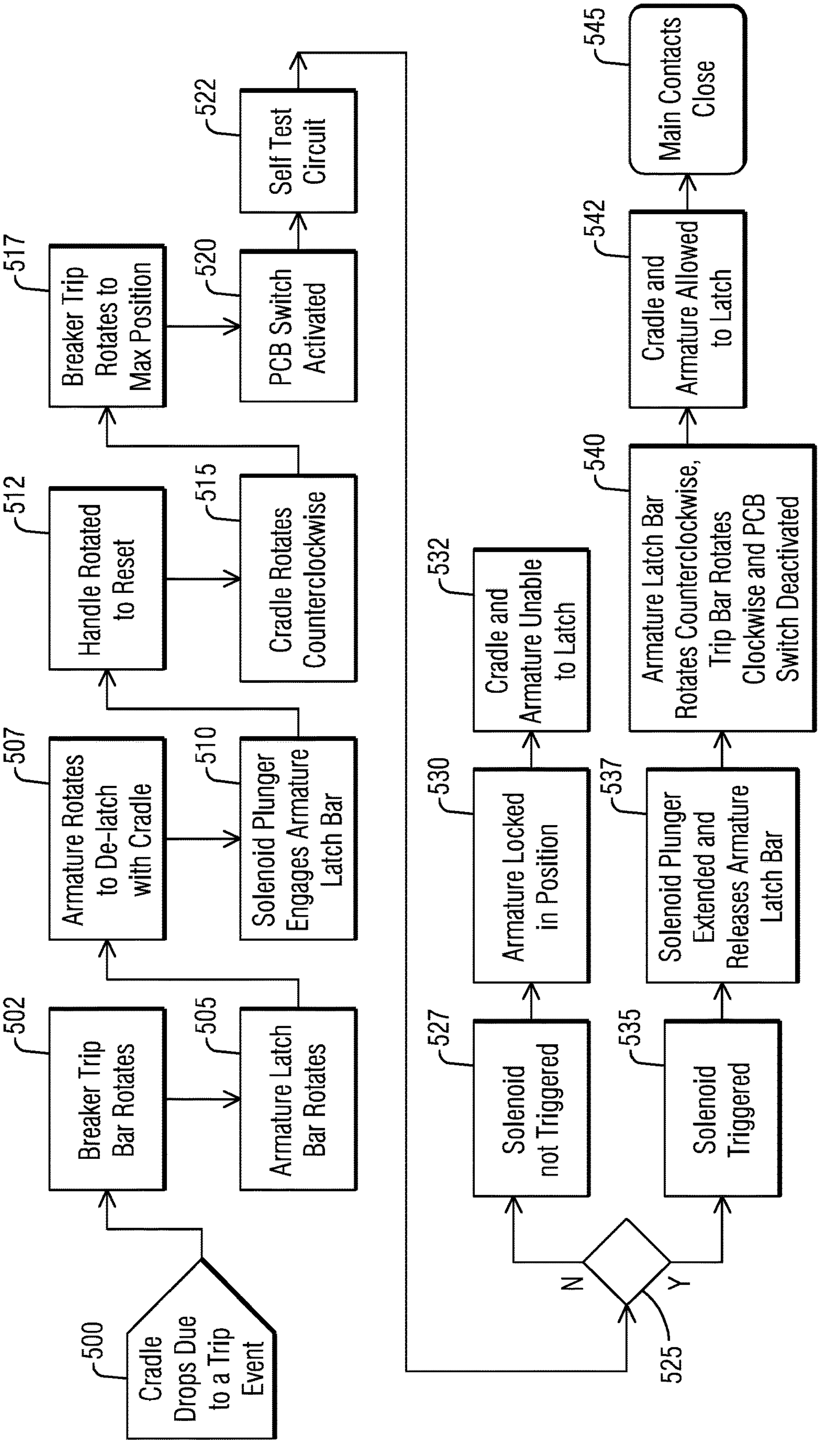
FIG. 51 illustrates a decision tree for an armature latch lock mechanism according to an exemplary embodiment of the present invention.

FIG. 51 illustrates a decision tree for an armature latch lock mechanism according to an exemplary embodiment of the present invention. At a block 500, the breaker cradle 242 drops due to a trip event. At a block 502, the breaker trip bar 500 rotates. At a block 505, the armature latch bar 202 rotates. Then in a block 507 the breaker armature 330 rotates to de-latch with the breaker cradle 242. Next at a block 510, the solenoid plunger or the solenoid plunger feature 230 engages the armature latch bar 202. At this point in a block 512, the breaker handle 402 is rotated to a reset position. The breaker cradle 242 rotates counter clockwise in a block 515. In a block 517, the breaker trip bar rotates to the maximum position. The PCB switch 207 is activated in a block 520. A self test circuit is activated in a block 522.

At a decision block 525, the solenoid 205 is checked as to its triggering. At a block 527, the solenoid 205 is not triggered. At a block 530, the breaker armature 330 is locked in position. The breaker cradle 242 and the breaker armature 330 are unable to latch in a block 532. However, if at a block 535 the solenoid 205 is triggered then the solenoid plunger or the solenoid plunger feature 230 is extended and this releases the armature latch bar 202 at a block 537. At a block 540, the armature latch bar 202 rotates counter clockwise, the breaker trip bar 500 rotates clockwise and the PCB switch 207 is deactivated. At a block 542, the breaker cradle 242 and the breaker armature 330 are allowed to latch. Then, in a block 545 the main contacts of the 2-pole residential electronic circuit breaker 5 close.

Figure 52:
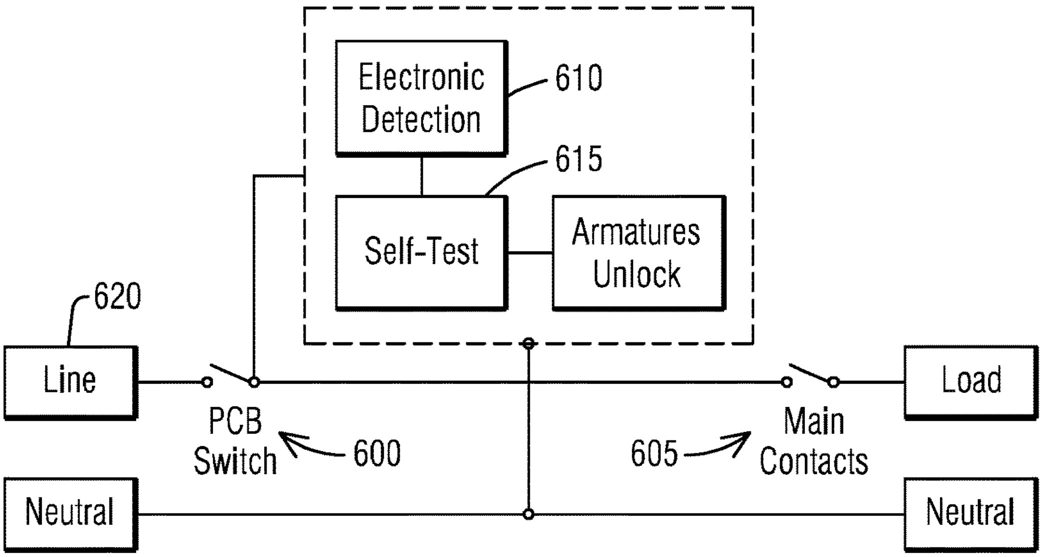
FIG. 52 illustrates logic for electronics of a PCB switch in a PCB assembly of a 2 and/or 3 pole circuit breaker according to an exemplary embodiment of the present invention.

FIG. 52 illustrates logic for electronics of a PCB switch 600 in a PCB assembly of a 2 and/or 3 pole circuit breaker such as the 2-pole residential electronic circuit breaker 5 according to an exemplary embodiment of the present invention. FIG. 12 is a block diagram of an exemplary overall setup. In FIG. 12, the PCB switch 600 and main contacts 605 are shown with the lines broken or open. When the breaker trip bar 500 rotates to its max position, the PCB switch 600 is activated closing this part of the circuit. Once closed, electronics detection 610 will conduct a self test 615 to verify the electronic circuitry is working properly and/or determine if an arc is present on a line 620. If the self test 615 passes and no arc is detected on the line 620, the solenoid 205 is activated (not shown in the block diagram) and the armature latch bar 202 is unlatched with a solenoid plunger tip. This allows the 2-pole residential electronic circuit breaker 5 to be able to latch (between the breaker cradle 242 and armature latch surfaces) and the main contacts 605 can be closed when the breaker handle 402 is rotated to the ON position. If an arc is present on the line 620 or the self test 615 does not pass, the armature latch bar 202 is not de-latched and the main contacts 605 cannot be closed when the breaker handle 402 is moved to the ON position.

As used herein, "residential electronic circuit breaker" refers to an automatically operated electrical switch designed to protect an electrical circuit from damage caused by excess current, typically resulting from an overload or short circuit. Its basic function is to interrupt current flow after a fault is detected. The "residential electronic circuit breaker," in addition to the exemplary hardware description above, refers to a thermal-magnetic circuit breaker or a GFCI type circuit breaker or a CAFCI type circuit breaker that is intended for switching and protection of a home's wiring from high temperatures caused by excess current higher than the rating of the wire. The “residential electronic circuit breaker” is a device that shuts off an electric power circuit when it detects that current is flowing along an unintended path.

The techniques described herein can be particularly useful for using “residential electronic circuit breaker”. While particular embodiments are described in terms of the “residential electronic circuit breaker”, the techniques described herein are not limited to the “residential electronic circuit breaker” but can also use other types of circuit breakers.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms “comprises,” “comprising,” “includes,” “including,” “has,” “having” or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases “in one embodiment,” “in an embodiment,” or “in a specific embodiment” or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A multi-pole circuit breaker comprising:

a breaker mechanism including a breaker armature;

a cradle; and an armature latch bar to prevent the breaker armature from latching with the cradle, wherein the armature latch bar includes:

a recessed feature that interfaces with the breaker armature, an armature latching surface that needs to be removed before the breaker mechanism can be latched, and an armature latching lever that prevents a rotation of the breaker armature.

2. The multi-pole circuit breaker of claim 1, further comprising:

a breaker trip bar that includes a recessed area to interface with the armature latch bar.

3. The multi-pole circuit breaker of claim 2, wherein the breaker trip bar includes a surface to rotate the armature latch bar clockwise during a trip event.

4. The multi-pole circuit breaker of claim 2, wherein the breaker trip bar includes a feature to activate a printed circuit board (PCB) switch.

5. The multi-pole circuit breaker of claim 1, further comprising:

a printed circuit board (PCB) assembly including an electronic circuitry to activate at least one of a solenoid assembly and an electromagnet.

6. The multi-pole circuit breaker of claim 5, wherein the printed circuit board (PCB) assembly includes an outer perimeter that is nested within a surrounding plastic geometry.

7. The multi-pole circuit breaker of claim 1, further comprising:

a breaker trip bar that includes a recessed area to interface with the armature latch bar; and a solenoid assembly that is activated when the breaker trip bar is rotated to a maximum rotation.

8. The multi-pole circuit breaker of claim 7, wherein the solenoid assembly includes:

a plunger with a smaller radius to engage with a surface of the armature latch bar.

9. The multi-pole circuit breaker of claim 1, further comprising:

a right pole (RP) assembly including a right pole (RP) base and a right pole (RP) cover, wherein the RP cover includes recessed areas to accommodate one or more printed circuit board (PCB) components.

10. The multi-pole circuit breaker of claim 1, further comprising:

a left pole (LP) assembly including a left pole (LP) base and a left pole (LP) cover, wherein the LP base includes recessed areas to accommodate a printed circuit board (PCB) assembly and a wire routing.

11. The multi-pole circuit breaker of claim 10, wherein the left pole (LP) base includes a first recessed area for the wire routing that is connected from a line terminal and to a printed circuit board (PCB) assembly.

12. The multi-pole circuit breaker of claim 11, wherein the left pole (LP) base includes a second recessed area to capture the PCB assembly.

13. The multi-pole circuit breaker of claim 10, wherein the left pole (LP) base includes a plurality of stops to prevent the armature latch bar rotation clockwise and/or counter-clockwise.

14. The multi-pole circuit breaker of claim 1, further comprising:

a right pole (RP) base and a left pole (LP) cover that include a set of journals for a set of armature latch bar posts to rotate about a specific point.

15. The multi-pole circuit breaker of claim 1, further comprising:

a printed circuit board (PCB) switch that is activated when a breaker trip bar feature is rotated to a maximum rotation.

16. The multi-pole circuit breaker of claim 1, wherein the printed circuit board (PCB) switch is momentarily activated during rotation of the cradle when a breaker handle is rotated towards a reset position.

17. A ground fault circuit interrupter (GFCI) and/or a combination arc-fault circuit interrupting (CAFCI) two or three pole residential circuit breaker comprising:

a breaker mechanism including a breaker armature;

a cradle;

an armature latch bar to prevent the breaker armature from latching with the cradle, wherein the armature latch bar includes:

a recessed feature that interfaces with the breaker armature, an armature latching surface that needs to be removed before the breaker mechanism can be latched, and an armature latching lever that prevents a rotation of the breaker armature;

a breaker trip bar that includes a recessed area to interface with the armature latch bar; and a printed circuit board (PCB) assembly including an electronic circuitry to activate at least one of a solenoid assembly and an electromagnet.

18. The ground fault circuit interrupter (GFCI) and/or combination arc-fault circuit interrupting (CAFCI) two or three pole residential circuit breaker of claim 17, wherein the breaker trip bar includes a surface to rotate the armature latch bar clockwise during a trip event.

19. The ground fault circuit interrupter (GFCI) and/or combination arc-fault circuit interrupting (CAFCI) two or three pole residential circuit breaker of claim 17, wherein the breaker trip bar includes a feature to activate a printed circuit board (PCB) switch.

20. The ground fault circuit interrupter (GFCI) and/or combination arc-fault circuit interrupting (CAFCI) two or three pole residential circuit breaker of claim 18, wherein the solenoid assembly includes a plunger with a smaller radius to engage with a surface of the armature latch bar.

* * * * *